(12) United States Patent
Katsavounidis et al.

(10) Patent No.: US 11,825,029 B2
(45) Date of Patent: *Nov. 21, 2023

(54) COMPARING VIDEO ENCODERS/DECODERS USING SHOT-BASED ENCODING AND A PERCEPTUAL VISUAL QUALITY METRIC

(71) Applicant: NETFLIX, INC., Los Gatos, CA (US)

(72) Inventors: Ioannis Katsavounidis, San Jose, CA (US); Liwei Guo, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/516,525

(22) Filed: Nov. 1, 2021

(65) Prior Publication Data

US 2022/0166990 A1    May 26, 2022

Related U.S. Application Data

(63) Continuation of application No. 16/543,476, filed on Aug. 16, 2019, now Pat. No. 11,166,034, which is a
(Continued)

(51) Int. Cl.
*H04N 19/196* (2014.01)
*H04N 19/85* (2014.01)

(52) U.S. Cl.
CPC .......... *H04N 19/196* (2014.11); *H04N 19/85* (2014.11)

(58) Field of Classification Search
CPC .............................. H04N 19/196; H04N 19/85
(Continued)

(56) References Cited

U.S. PATENT DOCUMENTS

| 5,612,742 A | 3/1997 | Krause et al. |
| 7,394,410 B1 | 7/2008 | Wegener |

(Continued)

FOREIGN PATENT DOCUMENTS

| CN | 1393109 A | 1/2003 |
| CN | 1778117 A | 5/2006 |

(Continued)

OTHER PUBLICATIONS

Final Office Action received for U.S. Appl. No. 17/170,661 dated Aug. 22, 2022, 30 pages.

(Continued)

*Primary Examiner* — Amir Shahnami
(74) *Attorney, Agent, or Firm* — Artegis Law Group, LLP

(57) ABSTRACT

In various embodiments, an encoder comparison application compares the performance of different configured encoders. In operation, the encoder comparison application generates a first global convex hull of video encode points based on a first configured encoder and a set of subsequences included in a source video sequence. Each video encode point is associated with a different encoded version of the source video sequence. The encoder comparison application also generates a second global convex hull of video encode points based on a second configured encoder and the subsequences. Subsequently, the encoder configuration application computes a performance value for an encoding comparison metric based on the first global convex hull and the second global convex hull. Notably, the first performance value estimates a difference in performance between the first configured encoder and the second configured encoder.

22 Claims, 9 Drawing Sheets

Related U.S. Application Data continuation-in-part of application No. 16/016,432, filed on Jun. 22, 2018, now Pat. No. 10,742,708, which is a continuation-in-part of application No. 15/902,976, filed on Feb. 22, 2018, now Pat. No. 10,917,644.

(60) Provisional application No. 62/765,180, filed on Aug. 17, 2018, provisional application No. 62/550,517, filed on Aug. 25, 2017, provisional application No. 62/534,170, filed on Jul. 18, 2017, provisional application No. 62/462,873, filed on Feb. 23, 2017.

(58) Field of Classification Search
USPC .................................................... 375/240.02
See application file for complete search history.

(56) References Cited

U.S. PATENT DOCUMENTS

| | | | |
|---|---|---|---|
| 8,837,601 | B2 | 9/2014 | Ronca et al. |
| 8,982,942 | B2 | 3/2015 | Gao et al. |
| 9,036,712 | B1 | 5/2015 | Cote et al. |
| 9,131,202 | B1 | 9/2015 | Espeset et al. |
| 9,398,301 | B2 | 7/2016 | Ronca et al. |
| 9,584,700 | B2 | 2/2017 | Morovic et al. |
| 10,074,382 | B2 | 9/2018 | Hoerich et al. |
| 10,097,339 | B1 | 10/2018 | Pogue |
| 10,666,992 | B2 | 5/2020 | Katsavounidis |
| 10,742,708 | B2 | 8/2020 | Katsavounidis et al. |
| 11,153,581 | B1 | 10/2021 | Purushe |
| 2002/0116715 | A1 | 8/2002 | Apostolopoulos |
| 2004/0161158 | A1 | 8/2004 | Kondo et al. |
| 2005/0031219 | A1 | 2/2005 | Puri et al. |
| 2005/0111824 | A1 | 5/2005 | Hunter et al. |
| 2007/0047639 | A1 | 3/2007 | Ye |
| 2007/0064793 | A1 | 3/2007 | Wang et al. |
| 2008/0043832 | A1 | 2/2008 | Barkley et al. |
| 2008/0232466 | A1 | 9/2008 | Faerber et al. |
| 2009/0295905 | A1 | 12/2009 | Civanlar et al. |
| 2010/0189183 | A1 | 7/2010 | Gu et al. |
| 2010/0202671 | A1* | 8/2010 | Chen .................. G06V 40/1371 |
| | | | 382/125 |
| 2010/0290520 | A1 | 11/2010 | Kamisli et al. |
| 2011/0052087 | A1 | 3/2011 | Mukherjee |
| 2011/0069939 | A1 | 3/2011 | Choi et al. |
| 2011/0075734 | A1 | 3/2011 | Sakazume |
| 2011/0090949 | A1 | 4/2011 | Gu |
| 2011/0286525 | A1* | 11/2011 | Kamisli ............... H04N 19/122 |
| | | | 375/240.18 |
| 2012/0147958 | A1 | 6/2012 | Ronca et al. |
| 2012/0195369 | A1 | 8/2012 | Guerrero |
| 2012/0330632 | A1* | 12/2012 | Oganov ................. G06N 3/126 |
| | | | 703/2 |
| 2013/0051768 | A1 | 2/2013 | Soroushian et al. |
| 2013/0089154 | A1 | 4/2013 | Chen et al. |
| 2013/0223510 | A1 | 8/2013 | Coudurier et al. |
| 2013/0329781 | A1 | 12/2013 | Su et al. |
| 2014/0040498 | A1 | 2/2014 | Oyman et al. |
| 2014/0201324 | A1 | 7/2014 | Zhang et al. |
| 2014/0219346 | A1 | 8/2014 | Ugur et al. |
| 2014/0241418 | A1 | 8/2014 | Garbas et al. |
| 2014/0294362 | A1 | 10/2014 | Pettersson et al. |
| 2015/0071346 | A1 | 3/2015 | Ronca et al. |
| 2015/0127337 | A1 | 5/2015 | Heigold et al. |
| 2015/0179224 | A1 | 6/2015 | Bloch et al. |
| 2015/0370796 | A1 | 12/2015 | Abramson et al. |
| 2016/0094802 | A1 | 3/2016 | Thomas et al. |
| 2016/0212433 | A1 | 7/2016 | Zhu et al. |
| 2016/0379057 | A1 | 12/2016 | Katsavounidis |
| 2017/0078376 | A1 | 3/2017 | Coward et al. |
| 2017/0078686 | A1 | 3/2017 | Coward et al. |
| 2017/0186147 | A1 | 6/2017 | He et al. |
| 2018/0007355 | A1 | 1/2018 | Borel et al. |
| 2018/0041788 | A1 | 2/2018 | Wang et al. |
| 2018/0063536 | A1 | 3/2018 | Carmel et al. |
| 2018/0063549 | A1 | 3/2018 | Amer et al. |
| 2018/0160161 | A1 | 6/2018 | Reznik et al. |
| 2018/0240502 | A1 | 8/2018 | Katsavounidis |
| 2018/0241795 | A1 | 8/2018 | Katsavounidis |
| 2018/0242002 | A1 | 8/2018 | Katsavounidis |
| 2018/0242015 | A1 | 8/2018 | Katsavounidis |
| 2018/0302456 | A1 | 10/2018 | Katsavounidis et al. |
| 2018/0343458 | A1 | 11/2018 | Katsavounidis et al. |
| 2019/0028529 | A1 | 1/2019 | Katsavounidis |
| 2019/0028745 | A1 | 1/2019 | Katsavounidis |

FOREIGN PATENT DOCUMENTS

| | | |
|---|---|---|
| CN | 102668495 A | 9/2012 |
| CN | 102833538 A | 12/2012 |
| CN | 103501445 A | 1/2014 |
| CN | 103501446 A | 1/2014 |
| CN | 103918009 A | 7/2014 |
| CN | 103999090 A | 8/2014 |
| CN | 104185024 A | 12/2014 |
| CN | 104346613 A | 2/2015 |
| CN | 104737149 A | 6/2015 |
| CN | 104767999 A | 7/2015 |
| CN | 105868700 A | 8/2016 |
| CN | 106537923 A | 3/2017 |
| EP | 2 410 749 A1 | 1/2012 |
| JP | 2005-260576 A | 9/2005 |
| WO | 02/32141 A2 | 4/2002 |

OTHER PUBLICATIONS

Non Final Office Action received for U.S. Appl. No. 17/151,079 dated Sep. 29, 2022, 17 pages.
Notice of Allowance received for U.S. Appl. No. 16/882,386 dated Oct. 13, 2022, 20 pages.
Final Office Action received for U.S. Appl. No. 17/151,079 dated Jun. 2, 2022, 21 pages.
Non Final Office Action received for U.S. Appl. No. 16/053,754 dated Jul. 6, 2022, 23 pages.
Non Final Office Action received for U.S. Appl. No. 15/902,970 dated Apr. 5, 2019, 53 pages.
Final Office Action received for U.S. Appl. No. 15/902,970 dated Oct. 31, 2019, 36 pages.
Non Final Office Action received for U.S. Appl. No. 15/902,971 dated Oct. 31, 2019, 40 pages.
Non Final Office Action received for U.S. Appl. No. 16/016,432 dated Sep. 13, 2019, 40 pages.
Non Final Office Action received for U.S. Appl. No. 16/053,754 dated Aug. 21, 2019, 22 pages.
Non Final Office Action received for U.S. Appl. No. 16/034,303 dated Jul. 10, 2019, 22 pages.
Non Final Office Action received for U.S. Appl. No. 15/902,975 dated Aug. 22, 2019, 26 pages.
Non Final Office Action received for U.S. Appl. No. 15/902,976 dated Jan. 2, 2020, 30 pages.
Notice of Allowance received for U.S. Appl. No. 16/034,303 dated Jan. 14, 2020, 15 pages.
Advisory Action received for U.S. Appl. No. 15/902,970 dated Feb. 10, 2020, 10 pages.
Final Office Action received for U.S. Appl. No. 15/902,971 dated Feb. 20, 2020, 45 pages.
Non Final Office Action received for U.S. Appl. No. 16/054,621 dated Mar. 5, 2020, 35 pages.
Final Office Action received for U.S. Appl. No. 16/053,754 dated Mar. 18, 2020, 23 pages.
Notice of Allowance received for U.S. Appl. No. 15/902,975 dated Mar. 4, 2020, 13 pages.
Non Final Office Action received for U.S. Appl. No. 15/902,970 dated Mar. 30, 2020, 45 pages.
Notice of Allowance received for U.S. Appl. No. 16/016,432 dated Apr. 1, 2020, 20 pages.
Non Final Office Action received for U.S. Appl. No. 15/902,971 dated Jul. 2, 2020, 36 pages.

(56) References Cited

OTHER PUBLICATIONS

Final Office Action received for U.S. Appl. No. 15/902,976 dated Jul. 10, 2020, 47 pages.
Non Final Office Action received for U.S. Appl. No. 16/543,476 dated Jul. 6, 2020, 55 pages.
Non Final Office Action received for U.S. Appl. No. 16/053,754 dated Aug. 12, 2020, 24 pages.
Final Office Action received for U.S. Appl. No. 16/054,621 dated Aug. 25, 2020, 29 pages.
Notice of Allowance received for U.S. Appl. No. 15/902,970 dated Sep. 4, 2020, 27 pages.
Notice of Allowance received for U.S. Appl. No. 16/054,621 dated Jan. 27, 2021, 13 pages.
Final Office Action received for U.S. Appl. No. 15/902,971 dated Dec. 10, 2020, 41 pages.
Notice of Allowance received for U.S. Appl. No. 15/902,976 dated Sep. 30, 2020, 8 pages.
Non Final Office Action received for U.S. Appl. No. 16/543,476 dated Jan. 7, 2021, 22 pages.
Final Office Action received for U.S. Appl. No. 16/053,754 dated Jan. 28, 2021, 25 pages.
Notice of Allowance received for U.S. Appl. No. 16/034,303 dated Dec. 4, 2019, 8 pages.
Non Final Office Action received for U.S. Appl. No. 16/882,386 dated Oct. 9, 2020, 29 pages.
Non Final Office Action received for U.S. Appl. No. 15/902,971 dated Mar. 17, 2021, 36 pages.
Notice of Allowance received for U.S. Appl. No. 16/054,621 dated Apr. 16, 2021, 15 pages.
Non Final Office Action received for U.S. Appl. No. 16/882,386 dated Apr. 6, 2021, 21 pages.
Notice of Allowance received for U.S. Appl. No. 16/054,621 dated Jun. 10, 2021, 14 pages.
Notice of Allowance received for U.S. Appl. No. 16/543,476 dated Jun. 25, 2021, 16 pages.
Notice of Allowance received for U.S. Appl. No. 15/902,971 dated Jul. 21, 2021, 17 pages.
Non Final Office Action received for U.S. Appl. No. 16/053,754 dated Jul. 16, 2021, 26 pages.
Non Final Office Action received for U.S. Appl. No. 16/987,331 dated Nov. 29, 2021, 54 pages.
Final Office Action received for U.S. Appl. No. 16/882,386 dated Sep. 30, 2021, 28 pages.
Non Final Office Action received for U.S. Appl. No. 17/151,079 dated Nov. 24, 2021, 47 pages.
Final Office Action received for U.S. Appl. No. 16/053,754 dated Feb. 9, 2022, 18 pages.
Non Final Office Action received for U.S. Appl. No. 16/882,386 dated Mar. 28, 2022, 17 pages.
Non Final Office Action received for U.S. Appl. No. 17/170,661 dated Mar. 2, 2022, 44 pages.
Notice of Allowance received for U.S. Appl. No. 16/987,331 dated Apr. 20, 2022, 17 pages.
Westerink et al., "An Optimal Bit Allocation Algorithm for Sub-Band Coding", ICASSP-88., International Conference on Acoustics, Speech, and Signal Processing, Apr. 11-14, 1988, pp. 757-760.
Riskin, Eve A., "Optimal Bit Allocation via the Generalized BFOS Algorithm", IEEE Transactions on Information Theory, Mar. 1, 1991, vol. 37, No. 2, pp. 400-402.
Yu et al., "Efficient Rate Control for JPEG-2000", IEEE Transactions on Circuits and Systems for Video Technology, May 1, 2006, vol. 16, No. 5, pp. 577-589.
Wu et al., "Rate-Constrained Picture-Adaptive Quantization for JPEG Baseline Coders", IEEE International Conference on Acoustics, Speech, and Signal Processing, Apr. 27-30, 1993, pp. 389-392.
Sermadevi et al., "Efficient Bit Allocation for Dependent Video Coding", DCC '04 Proceedings of the Conference on Data Compression, Mar. 23, 2004, 6 pages.

Ramchandran et al., "Bit Allocation for Dependent Quantization with Applications to Multiresolution and MPEG Video Coders", IEEE Transactions on Image Processing, Sep. 1994, vol. 3, No. 5, pp. 533-545.
Ortega et al., "Rate-Distortion Methods for Image and Video Compression", IEEE Signal Processing Magazine, Nov. 1998, vol. 15, No. 6, pp. 23-50.
Wiegand et al., "Overview of the H.264/AVC Video Coding Standard," DOI: 10.1109/TCSVT.2003.815165, Circuits and Systems for Video Technology, IEEE Transactions, vol. 13, No. 7, Jul. 2003, pp. 560-576.
Zhao et al., "Another example of software replacing hardware: Real-time software MPEG-2 SDI/HD encoding for digital tv broadcasting," in NAB Broadcast Engineering Conference, 2003, pp. 37-40.
The Netflix tech blog: High quality video encoding at scale, link: http://techblog.netnix.com/2015/12/high-qualityvideo-encoding-at-scale.html.
I. E. Richardson, H. 264 and MPEG-4 video compression: video coding for next-generation multimedia. John Wiley & Sons, 2004.
R. G. Keys, "Cubic convolution interpolation for digital image processing," IEEE Trans. on Acoustics, Speech, and Signal Processing, vol. ASSP-29, No. 6, 1981, pp. 1153-1160.
Lanczos, Cornelius, "Resampling", Retrieved from http://en.wikipedia.org/wiki/Lanczos, Wikipedia, 5 pages.
"The Netflix tech blog: Per-Title Encode Optimization," link: http://techblog.netflix.com/2015/12/per-title-encode-Jptimization.html, 17 pages.
Katsavounidis et al., "Native resolution detection of video sequences," in SMPTE 2015 Annual Technical Conference and Exhibition, manuscript version dated Sep. 3, 2015, 26 pages.
Li et al., "Toward a Practical Perceptual Video Quality Metric", Nelflix Technology Blog, https://nelflixtechblog.com/toward-a-practical-perceptual-video-quality-metric-653f208b9652, Jun. 6, 2016, 21 pages.
Mitrofanov et al., "x264," Retrieved from link: https://en.wikipedia.org/wiki/X264, Wikipedia, 5 pages.
Tavakoli et al., "Quality of experience of adaptive video streaming: Investigation in service parameters and subjective quality assessment methodology," Signal Processing: Image Communication, vol. 39, 2015, pp. 432-443.
Consumer Digital Video Library—El Fuente, link: http://www.cdvl.org/documents/ElFuente_summary.pdf.
Sullivan et al., Rate-distortion optimization for video compression; IEEE signal processing magazine, vol. 15, No. 6, 1998, pp. 74-90.
Thiede et al., "Peaq—the ITU standard for objective measurement of perceived audio quality," Journal of the Audio Engineering Society, vol. 48, No. 1/2, 2000, pp. 3-29.
Consumer Digital Video Library; link: http://www.cdvl.org.
"Advanced video coding for generic audiovisual services", I T U-T Rec. H.264 and ISO/IEC 14496-10 (AVG), 2003, 282 pages.
"High effciency video coding", I T U-T Rec. H.265 and ISO/IEC 23008-2 (HEVC), 2013, 317 pages.
Grange et al., "VP9 Bitstream & Decoding Process Specification", Version 0.6, Retrieved from https://storage.googleapis.com/downloads.webmprojecl.org/docs/vp9/vp9-bitstream-specification-v0.6-20160331-draft.pdf, 2016, 171 pages.
Suehring, Karsten, "H.264/AVC software", http://iphome.hhi.de/suehring/tml/, retrieved May 17, 2020, 1 page.
"High Efficiency Video Coding (HEVC) I JCT-VG", Fraunhofer Heinrich Hertz Institute, hllps://hevc.hhi.fraunhofer.de, retrieved Apr. 17, 2020, 2 pages.
"Webproject / libvpx", https://github.com/webmprojecl/libvpx, retrieved Apr. 17, 2020, 5 pages.
Bjontegaard, Gisle, "Calculation of average psnr differences between rd curves," I T U-T Q.6/SG16 VCEG 13th meeting, https://www.itu.int/wflp3/av-arch/video-site/0104_Aus/VCEG-M33.doc, 2001, 4 pages.
Katsavounidis, Ioannis, "Netflix—"El Fuente" video sequence details and scenes", Jul. 28, 2015, http://www.cdvl.org/documents/ElFuente_summary.pdf, 64 pages.

(56) References Cited

OTHER PUBLICATIONS

Katsavounidis, Ioannis, "Netflix—"Chimera" video sequence details and scenes", https://www.cdvl.org/documents/NETFLIX_Chimera_4096x2160_Download_Instructions.pdf, Nov. 2, 2015, 189 pages.

Wang et al., "Image Quality Assessment: From Error Visibility to Structural Similarity", DOI:10.1109/TIP.2003.819861, IEEE Transactions on Image Processing, vol. 13, No. 4, Apr. 2004, pp. 600-612.

Sheikh et al., "Image Information and Visual Quality", DOI:10.1109/TIP.2005.859378, IEEE Transactions on ImageProcessing, vol. 15, No. 2, Feb. 2006, pp. 430-444.

Netflix / VMAF, https://github.com/Netflix/vmaf, retrieved Apr. 17, 2020, 4 pages.

Li et al., "Full-Reference Video Quality Assessment by Decoupling Detail Losses and Additive Impairments", DOI:10.1109/TCSVT.2012.2190473, Circuits and Systems for Video Technology, IEEE Transactions, vol. 22, No. 7, Jul. 2012, pp. 1100-1112.

Winkler, Stefan, "Analysis of Public Image and Video Databases for Quality Assessment", DOI:10.1109/JSTSP.2012.2215007, IEEE Journal of Selected Topics in Signal Processing, vol. 6, No. 6, Oct. 2012, pp. 516-625.

Cortes et al., "Support-Vector Networks", Machine Learning, vol. 20, 1995, pp. 273-297.

Katsavounidis, Ioannis, "Dynamic optimizer—a perceptual video encoding optimization framework", Netflix Technology Blog, https://netflixtechblog.com/dynamic-optimizer-a-perceptual-video-encoding-optimization-framework-e19f1e3a277f, Mar. 5, 2018, 22 pages.

Manohara et al., "Optimized shot-based encodes: Now streaming!", Netflix Technology Blog, https://netflixtechblog.com/optimized-shot-based-encodes-now-streaming-4b9464204830, Mar. 9, 2018, 9 pages.

"Mirror / x264", https://github.com/mirror/x264, retrieved May 17, 2020, 1 page.

"FFmpeg / FFmpeg", https://github.com/FFmpeg/FFmpeg, retrieved May 17, 2020, 3 pages.

"Videolan / x265", https://github.com/videolan/x265, retrieved May 17, 2020, 1 page.

"Eve-VP9 Maximize the Capabilities of VP9 for Your Video Streaming", Two Orioles, https://www.twoorioles.com/eve-vp9, retrieved May 17, 2020, 7 pages.

Netflix Technology Blog, https://netflixtechblog.com/per-title-encode-optimization-7e99442b62a2, Dec. 14, 2015, retrieved Feb. 20, 2018, 17 pages.

Wang et al., "Videoset: A large-scale compressed video quality dataset based on JND measurement", http://dx.doi.org/10.1016/j.jvcir.2017.04.009, Journal of Visual Communication and Image Representation, vol. 46, 2017, pp. 292-302.

Mareddy et al., "Simplifying Media Innovation at Netflix with Archer", Netflix Technology Blog, https://netflixtechblog.com/simplifying-media-innovation-at-netflix-with-archer-3f8cbb0e2bcb, Jun. 20, 2018, retrieved May 4, 2020, 20 pages.

Tan et al., "Video Quality Evaluation Methodology and Verification Testing of HEVC Compression Performance", IEEE Transactions on Circuits and Systems for Video Technology, XP011592174, DOI: 10.1109/TCSVT.2015.2477916, vol. 26, No. 1, Jan. 1, 2016, pp. 76-90.

Hanhart et al., "Calculation of average coding efficiency based on subjective quality scores", Journal of Visual Communication and Image Representation, Academic Press, XP028661468, http://dx.doi.org/10.1016/j.vcir.2013.11.008, vol. 25, No. 3, Dec. 4, 2013, pp. 555-564.

Ortega, Antonio, "Optimal bit allocation under multiple rate constraints", Proceedings of Data Compression conference—DCC '96, 10.1109/DCC.1996.488340, 1996, pp. 349-358.

Notice of Allowance received for U.S. Appl. No. 17/151,079 dated Apr. 19, 2023, 18 pages.

Final Office Action received for U.S. Appl. No. 16/053,754 dated Jan. 26, 2023, 17 pages.

Non Final Office Action received for U.S. Appl. No. 17/504,412 dated Feb. 2, 2023, 50 pages.

Non Final Office Action received for U.S. Appl. No. 17/532,869 dated May 22, 2023, 84 pages.

Notice of Allowance received for U.S. Appl. No. 17/504,412 dated Jun. 1, 2023, 17 pages.

Notice of Allowance received for U.S. Appl. No. 17/170,661 dated Jul. 3, 2023, 25 pages.

Non Final Office Action received for U.S. Appl. No. 16/053,754 dated Sep. 19, 2023, 18 pages.

* cited by examiner

COMPARING VIDEO ENCODERS/DECODERS USING SHOT-BASED ENCODING AND A PERCEPTUAL VISUAL QUALITY METRIC

CROSS-REFERENCE TO RELATED APPLICATIONS

This application is a continuation of the co-pending U.S. patent application titled, "COMPARING VIDEO ENCODERS/DECODERS USING SHOT-BASED ENCODING AND A PERCEPTUAL VISUAL QUALITY METRIC," filed on Aug. 16, 2019 and having Ser. No. 16/543,476, which is a continuation-in-part of the co-pending United States patent application titled, "ITERATIVE TECHNIQUES FOR GENERATING MULTIPLE ENCODED VERSIONS OF A MEDIA TITLE," filed on Jun. 22, 2018 and having Ser. No. 16/016,432, issued as U.S. Pat. No. 10,742,708, which is a continuation-in-part of co-pending United States patent application titled, "ITERATIVE TECHNIQUES FOR ENCODING VIDEO CONTENT," filed on Feb. 22, 2018 and having Ser. No. 15/902,976, issued as U.S. Pat. No. 10,917,644 which claims the priority benefit of the United States Provisional patent application titled, "VIDEO ENCODING AT SCALE: PERCEPTUALLY OPTIMAL ENCODING OF VIDEO SEQUENCES," filed on Feb. 23, 2017 and having Ser. No. 62/462,873, the United States Provisional patent application titled, "ENCODING TECHNIQUE FOR OPTIMIZING DISTORTION AND BITRATE," filed on Jul. 18, 2017 and having Ser. No. 62/534,170, and the United States Provisional patent application titled, "ENCODING TECHNIQUE FOR OPTIMIZING DISTORTION AND BITRATE," filed on Aug. 25, 2017 and having Ser. No. 62/550,517. The present application also claims the priority benefit of the United States Provisional patent application titled, "VIDEO CODEC COMPARISON USING DYNAMIC OPTIMIZER," filed on Aug. 17, 2018 and having Ser. No. 62/765,180. The subject matter of these related applications is hereby incorporated herein by reference

BACKGROUND

Field of the Various Embodiments

Embodiments relate generally to video and encoding technologies and, more specifically, to comparing video encoders/decoders using shot-based encoding and a perceptual visual quality metric.

Description of the Related Art

Being able to accurately and efficiently encode source video content is an important aspect of real-time delivery of high-quality video content. When encoding source video content, there are numerous encoder/decoders ("codecs") from which to choose. As a general matter, though, each different codec implements a different encoding algorithm that makes different trade-offs between quality and bitrate (i.e., the number of bits used for encoding). The effectiveness of any given encoding algorithm typically varies based on the type and complexity of the source video content, the resolution of the source video content, and any number of configuration parameters.

In many implementations, the configuration parameters associated with a given encoding algorithm are set to predetermined values, in essence creating a "configured encoder," and a value for a rate control parameter is varied based on a target bitrate or target quality. With this type of approach, however, if the "configured encoder" used to encode a particular source video at a target bitrate implements a sub-optimal tradeoff between quality and bitrate, then the quality, as perceived by a viewer, of the reconstructed source video derived from the encoded source video can be sub-optimal for the target bitrate. For this reason, comparing and selecting the best performing "configured encoder" to encode source videos for real-time delivery is usually an integral part of any content streaming service.

In one approach to comparing different configured encoders, an encoder comparison application encodes various source test sequences across the different configured encoders at the associated source resolutions using a set of fixed values for the rate control parameter. The encoder comparison application then computes a quality score for each of the resulting encoded test sequences with respect to the associated source test sequence using a pixel-based Peak-Signal-to-Noise-Ratio ("PSNR") fidelity metric. For each configured encoder, the encoder comparison application plots the quality scores against the bitrates for the associated encoded test sequences to generate a bitrate-quality curve. To compare the encoding results of two different configured encoders, the encoder comparison application computes an average bitrate percentage between the bitrate-quality curves of the configured encoders at the same quality score. This average bitrate percentage is a value for an encoder comparison metric known as a "Bjontegaard-delta rate" ("BD-rate") and is referred to herein as a "BD-rate value."

One drawback of the above approach is that each BD-rate value does not accurately and reliably predict the actual overall visual quality difference, as perceived by a viewer, between two different reconstructed source videos derived from the same source video that was encoded using the two different configured encoders. In particular, while PSNR accurately and reliably reflects signal fidelity (i.e., the faithfulness of the encoded video content to source video content), PSNR does not accurately and reliably predict human perception of quality. For example, PSNR does not reflect that visual artifacts in still scenes are likely to degrade the viewing experience of a viewer more than visual artifacts in fast-motion scenes. Further, BD-rate values oftentimes are calculated over bitrate-quality curves having extremely low and/or extremely high quality portions that can contribute disproportionately to the BD-rate values. Because of the inaccuracies associated with PSNR and extreme quality portions of the bitrate-quality curves, using BD-rate values to draw valid conclusions about whether one configured encoder performs better than another configured encoder with respect to human-perceived video quality is difficult, if not impossible.

As the foregoing illustrates, what is needed in the art are more effective techniques for comparing the performance of different configured encoders.

SUMMARY

One embodiment sets forth a computer-implemented method for comparing the performance of different configured encoders. The method includes generating a first global convex hull of video encode points based on a first configured encoder and a plurality of subsequences included in a source video sequence, where each video encode point is associated with a different encoded version of the source video sequence; generating a second global convex hull of video encode points based on a second configured encoder and the plurality of subsequences; and computing a first performance value for an encoding comparison metric based on the first global convex hull and the second global convex hull, where the first performance value estimates a difference in performance between the first configured encoder and the second configured encoder.

At least one technical advantage of the disclosed techniques relative to prior art is that the disclosed techniques can more accurately and reliably predict human-perceptible differences in the performance of video encoders/decoders. In that regard, in contrast to prior art approaches that estimate visual quality based on fidelity metrics, the disclosed techniques estimate visual quality based on perceptual quality metrics that more accurately and reliably predict human-perceived visual quality. In addition, the disclosed techniques automatically compute different encoding performance metric values using subsets of encoded video content associated with different portions of bitrate-quality curves. Consequently, the accuracy with which the encoding performance metric values predict encoding performance can be increased relative to prior art techniques where extremely low quality and/or extremely high quality portions of bitrate-quality curves can contribute disproportionately to the performance metric values. By more accurately and reliably predicting differences in encoding performance between different configured encoders, the disclosed techniques allow more valid conclusions to be drawn regarding whether one configured encoder performs better than another configured encoder. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
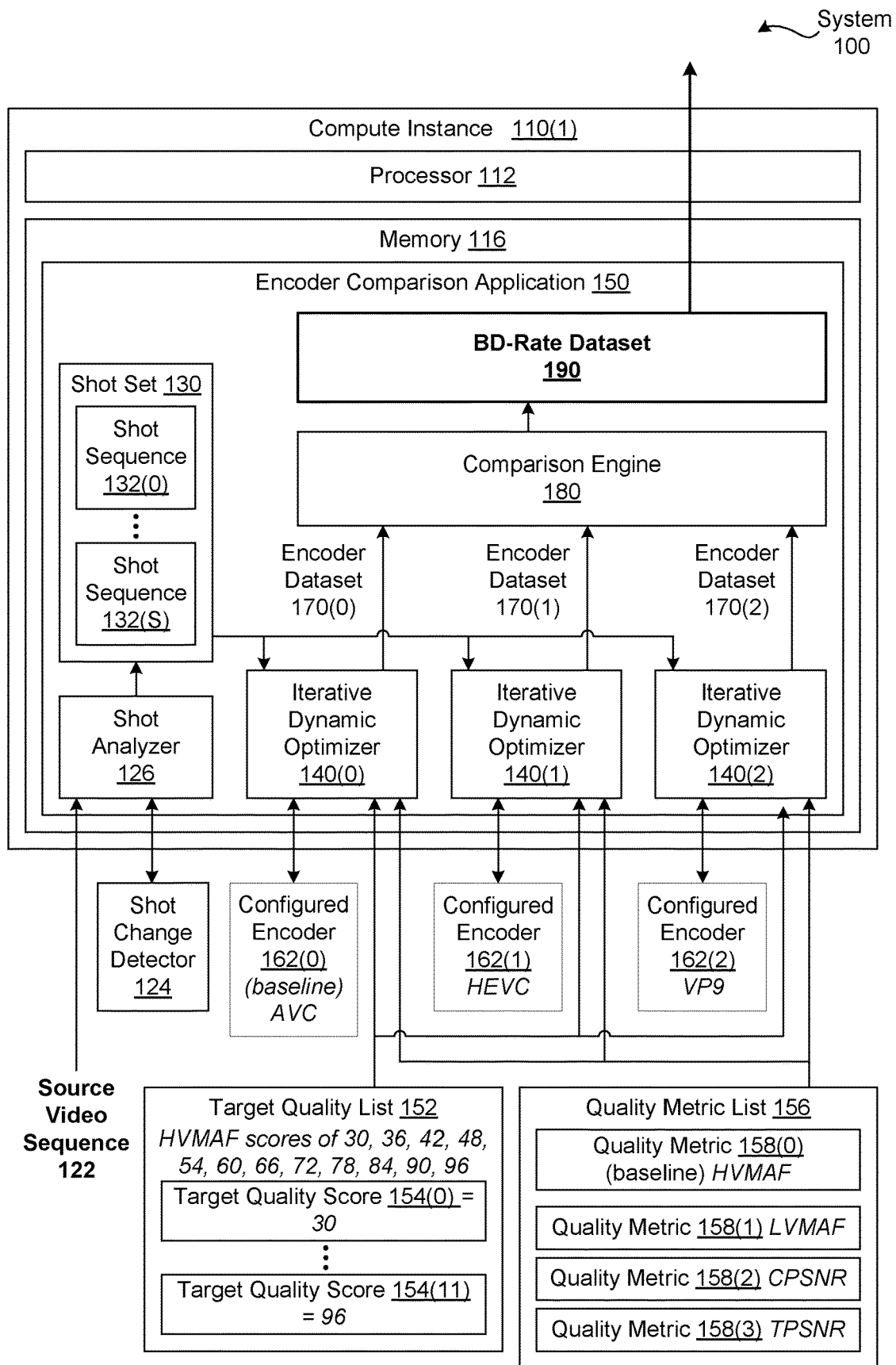
FIG. 1 is a conceptual illustration of a system configured to implement one or more aspects of the various embodiments.

In the following description, numerous specific details are set forth to provide a more thorough understanding of the various embodiments. However, it will be apparent to one of skilled in the art that the inventive concepts may be practiced without one or more of these specific details.

Accurately and efficiently encode source video content is an important aspect of real-time delivery of high-quality video content. When encoding source video content, there are numerous encoders from which to choose. As a general matter, though, the effectiveness of any given encoder typically varies based on the type and complexity of the source video content, the resolution of the source video content, a rate control parameter value, and any number of configuration parameters.

A typical content streaming service provider sets the configuration parameters associated with a given encoder to predetermined values, in essence creating a "configured encoder," and configures a shot-based encoding application to use the configured encoder to generate encoded versions of source videos. To generate a particular encoded version of a source video, the shot-based encoding application uses the configured encoder to encode different portions of the source video at different resolutions and rate control parameter values based on a target bitrate. If the configured encoder implements a sub-optimal tradeoff between quality and bitrate for any of the combinations of resolutions or rate control parameter values used to encode the source video, then the quality, as perceived by a viewer, of the reconstructed source video derived from the encoded source video can be sub-optimal for the target bitrate. For this reason, comparing and selecting the best performing "configured encoder" to encode source videos for real-time delivery is usually an integral part of any content streaming service.

In one approach to comparing different configured encoders, a conventional encoder comparison application encodes various source test sequences across the different configured encoders at the associated source resolutions using a set of fixed rate control parameter values. The conventional encoder comparison application then computes a quality score for each of the resulting encoded test sequences with respect to the associated source test sequence using a PSNR metric. For each configured encoder, the encoder comparison application plots the quality scores against the bitrates for the associated encoded test sequences to generate a bitrate-quality curve. To compare the encoding results of two different configured encoders, the encoder comparison application computes an average bitrate percentage between the bitrate-quality curves of the configured encoders at the same quality score. This average bitrate percentage is commonly referred to as a BD-rate value.

One drawback of the above approach is that each BD-rate value does not accurately and reliably predict the actual overall visual quality difference, as perceived by a viewer, between two different reconstructed source videos derived from the same source video that was encoded using the two different configured encoders. In particular, while PSNR accurately and reliably reflects signal fidelity (i.e., the faithfulness of the encoded video content to source video content), PSNR does not accurately and reliably predict human perception of quality. For example, PSNR does not reflect that visual artifacts in still scenes are likely to degrade the viewing experience of a viewer more than visual artifacts in fast-motion scenes. Further, BD-rate values oftentimes are calculated over bitrate-quality curves having extremely low and/or extremely high quality portions that can contribute disproportionately to the BD-rate values. Because of the inaccuracies associated with PSNR and extreme portions of bitrate-quality curves, using BD-rate values to draw valid conclusions about whether one configured encoder performs better than another configured encoder with respect to human-perceived video quality is difficult, if not impossible.

With the disclosed techniques, however, a content streaming service provider can use shot-based encoding and a metric designed to reflect human-perceived video quality to compute BD-rate values over quality ranges that are relevant to encoding source videos for real-time delivery. Importantly, the resulting BD-rate values more accurately reflect the performance of different configured encoders with respect to human-perceived video quality than BD-rate values computed using prior-art techniques.

In some embodiments, an encoding comparison application uses iterative shot-based encoding techniques to compute multiple BD-rate values that can be used to compare a candidate configured encoder to a baseline configured encoder. First, the encoding comparison application partitions a source video sequence into different shot sequences, where each of the shot sequences typically includes frames captured continuously from a given camera or point of capture. The encoding comparison application configures an instance of an iterative encoding application to perform shot-based encoding based on the shot sequences, the baseline configured encoder, a video multimethod assessment fusion ("VMAF") metric, and a set of target VMAF scores. In general, VMAF scores are computed using a machine learning model trained to accurately and reliably predict human-perceived visual quality based on subjective scores assigned by viewers when viewing reconstructed training video content derived from encoded versions of training video content. In parallel, the encoding comparison application configures an instance of the iterative encoding application to perform shot-based encoding based on the shot sequences, the candidate configured encoder, the VMAF metric, and the set of target VMAF scores.

In operation, the iterative dynamic optimizer generates different encoded shot sequence based on shot-specific sets of encoding points and the associated configured encoder (either the baseline configured encoder or the candidate configured encoder). Each encoding point included in a shot-specific set of encoding points specifies a different combination of a resolution and a rate control parameter value. The iterative encoding application then performs optimization operations to generate a global hull of video encode points. Each video encode point specifies a different encoded video sequence, the VMAF score of the encoded video sequence, and the bitrate of the encoded video sequence. Each encoded video sequence includes a set of encoded shot sequences that span the length of the source video sequence. Notably, the video encode points in the global convex hull, for the source video sequence and the encoding points, minimize the bitrate for different VMAF scores. Accordingly, the global convex hull can be used to define an optimized bitrate-quality curve.

For each of the target VMAF scores, the iterative dynamic optimizer selects the encoded video sequence included in the video encode point that lies closes to the target VMAF score as the corresponding target encoded video sequence. If any of the target encoded video sequences have changed since the previous iteration, then the iterative dynamic optimizer initiates a new iteration. To initiate a new iteration, the iterative dynamic optimizer adds additional encoding points to one or more of the sets of encoding points, uses the associated configured encoder to generate additional encoded shot sequences, generates a new global convex hull based on all of the encoded shot sequences, and identifies new target encoded video sequences. After the iterative dynamic optimizer finishes iterating, the iterative dynamic optimizer transmits the global convex hull to a comparison application.

Upon receiving the baseline global convex hull generated using the baseline configured encoder and the candidate global convex hull generated using the candidate configured encoder, the comparison application determines different quality ranges. A low quality range is bounded by the lowest target VMAF score and a middle VMAF score that is equal to the average of the lowest target VMAF score and the highest target VMAF score. A high quality range is bounded by the middle VMAF score and the highest target VMAF score. A full quality range includes all valid VMAF scores. The comparison application then compares different portions of the baseline global convex hull and the candidate global convex hull to compute a different BD-rate value for each quality range.

At least one technical advantage of the disclosed techniques relative to prior art is that the encoder comparison application can more accurately and reliably predict human-perceptible differences in the performance of configured encoders. Relative to PSNR metrics that are commonly used in prior art encoder comparison techniques, VMAF metrics more accurately and reliably predict human-perceived visual quality. Further, because the encoder comparison application computes different BD-rate values over different portions of the bitrate-quality curves, the accuracy with which each BD-rate value predicts encoding performance over the associated quality range is increased. By more accurately and reliably predicting differences in encoding performance between different configured encoders, the disclosed encoder comparison application allows more valid conclusions to be drawn regarding whether one configured encoder performs better than another configured encoder. These technical advantages provide one or more technological advancements over prior art approaches.

System Overview

FIG. 1 is a conceptual illustration of a system 100 configured to implement one or more aspects of the various embodiments. The system 100 includes, without limitation, a compute instance 110, a shot change detector 124, and configured encoders 162(0)-162(2). For explanatory purposes, multiple instances of like objects are denoted with reference numbers identifying the object and parenthetical numbers identifying the instance where needed. In alternate embodiments, the system 100 may include any number of compute instances 110 and E configured encoders 162, where E is an integer greater than or equal to 2.

Any number of the components of the system 100 may be distributed across multiple geographic locations or implemented in one or more cloud computing environments (i.e., encapsulated shared resources, software, data, etc.) in any combination. In alternate embodiments, the system 100 may include any number of compute instances 110. Each compute instance 110 may be implemented in a cloud computing environment, implemented as part of any other distributed computing environment, or implemented in a stand-alone fashion.

As shown, the compute instance 110 includes, without limitation, a processor 112 and a memory 116. The processor 112 may be any instruction execution system, apparatus, or device capable of executing instructions. For example, the processor 112 could comprise a central processing unit ("CPU"), a graphics processing unit ("CPU"), a controller, a micro-controller, a state machine, or any combination thereof. The memory 116 stores content, such as software applications and data, for use by the processor 112 of the compute instance 110. In alternate embodiments, each of any number of compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory, such as random access memory ("RAM"), read only memory ("ROM"), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

The compute instance 110 is configured to implement one or more applications or subsystems of applications. For explanatory purposes only, each application is described as residing in the memory 116 of a single compute instance 110 and executing on a processor 112 of the single compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110 is configured to compare the encoding performance of the configured encoders 162 based on the source video sequence 122. The source video sequence 122 includes, without limitation, any amount and type of video content that is associated with a video title. Examples of video content include, without limitation, any portion (including all) of feature-length films, episodes of television programs, and music videos, to name a few. An encoded version of the source video sequence 122 is also referred to herein as an "encoded video sequence" and includes, without limitation, encoded video content derived from the video content included in the source video sequence 122.

Furthermore, the source video sequence 122 includes, without limitation, any number of contiguous and non-overlapping shot sequences 132. Each of the shot sequences 132 includes a set of frames that usually have similar spatial-temporal properties and run for an uninterrupted period of time. An encoded version of a shot sequence 132(x) is also referred to herein as an "encoded shot sequence" and includes, without limitation encoded video content derived from the video content included in the shot sequence 132(x).

Each of the configured encoders 162 is associated with an encoder (not shown) and a configuration (not shown). At least one of the encoder and the configuration specified in the configured encoder 162(x) is different than the encoder and the configuration specified the configured encoder 162 (y). Each encoder performs encoding operations that generate encoded video content based on source video content concurrently, sequentially, or any combination thereof, via any number of compute instances 110. One or more encoders may be included in one or more coder/decoders (codecs). Some examples of encoders that are included in codecs are an Advanced Video Codec ("AVC") encoder, a High Efficiency Video Coding ("HEVC") encoder, a VP9 encoder, etc.

The configuration specifies the values for any number and type of parameters that customize the associated encoder. The parameters associated with a given configuration are also referred to herein as "configuration parameters." In general, a configuration parameter may be any parameter, option, mode, setting, etc., that impacts the encoding operations performed by the associated encoder. Examples of configuration parameters include, without limitation, a profile level, an analysis level, a search level, a psycho-visual option, a performance option, a tuning option, and so forth.

In some conventional approaches to comparing the performance of one configured encoder 162 to another configured encoder 162, a conventional encoder comparison application computes Bjontegaard delta rate (BD-rate) values using a Peak-Signal-to-Noise-ratio (PSNR) fidelity metric to measure quality. A BD-rate value is also referred to herein as "a value for a BD-rate." Each BD-rate value typically specifies a percentage bitrate change when encoding using the first configured encoder 162 relative to encoding using the second configured encoder 162 while maintaining the same PSNR value.

One drawback of a typical conventional encoder comparison application is that PSNR does not accurately and reliably predict human perception of quality. Another drawback is that a typical conventional encoder comparison application calculates BD-rate values over bitrate-quality curves having extremely low and/or extremely high quality portions that can contribute disproportionately to the BD-rate values. Because of the inaccuracies associated with PSNR and extreme quality portions of the bitrate-quality curves, using BD-rate values to draw valid conclusions about whether one configured encoder 162 performs better than another configured encoder 162 with respect to human-perceived video quality is problematic.

Increasing the Accuracy of BD-Rate Values

To address the above problems, the system 100 includes, without limitation, an encoder comparison application 150 that computes BD-rate values (not shown in FIG. 1) based on an iterative dynamic optimizer 140 that performs subsequence-based encoding of the source video sequence 122 and a least one perceptual visual quality metric. As described in greater detail herein, in subsequence-based encoding, the resolution and/or bitrate used to encode the source video sequence 122 can be varied across the source video sequence 122 to optimize encoding performance. Shot-based encoding is a type of subsequence-based encoding in which the resolution and/or bitrate may be different for each of the shot sequences 132. The perceptual quality metric may be any quality metric that is designed to accurately and reliably estimate the visual quality, as perceived by a viewer, of reconstructed source video content that is derived from an encoded version of source video content.

As shown, the encoder comparison application 150 resides in the memory 116 of the compute instance 110 and executes on the processor 112 of the compute instance 110.

In alternate embodiments, the functionality of the encoder comparison application 150 may be distributed across any number of other applications that reside in the memories 116 of any number of compute instances 110 and execute on the processors 112 of any number of compute instances 110 in any combination. Further, the functionality of any number of applications or subsystems included in the encoder comparison application 150 may be consolidated into a single application or subsystem.

Note that the techniques described herein are illustrative rather than restrictive, and may be altered without departing from the broader spirit and scope of the embodiments. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

In particular and for explanatory purposes only, the encoder comparison application 150 is described in the context of computing BD-rate values based on comparing the performance of each "non-baseline" configured encoder 162 to the performance of a "baseline" configured encoder 162 when encoding the source video sequence 122 using shot-based encoding. However, the techniques described herein are applicable to generating values for any type of encoder comparison metric based on any subsequence-based encoding technique that encodes the source video sequence 122 using any number of configured encoders 162. For instance, in some alternate embodiments, the encoder comparison application 150 may compare the performance of each configured encoder 162 to the performance of each of the other configured encoders 162.

As shown, the encoder comparison application 150 computes a BD-rate dataset 190 based on the configured encoders 162, a quality metric list 156, and a target quality list 152. The BD-rate dataset 190 includes, without limitation, any number of BD-rate values. Each of the BD-rate values included in the BD-rate dataset 190 compares the performance of a non-baseline configured encoder 162 to the performance of a baseline configured encoder 162. In some embodiments, the configured encoder 162(0) is the baseline configured encoder 162 and the other configured encoders 162 are the "non-baseline" configured encoders 162. In alternate embodiments, the encoder comparison application 150 may select one of the configured encoders 162 as the baseline configured encoder 162 in any technically feasible fashion. In yet other alternate embodiments, none of the configured encoders 162 are designated as a baseline configured encoder 162 and the techniques described herein are modified accordingly.

The quality metric list 156 includes, without limitation, quality metrics 158(0)-158(3). The quality metric 158(0) is also referred to herein as a "baseline" quality metric 158. The quality metric list 156, the quality metrics 158, and the baseline quality metric 158 may be specified and/or defined in any technically feasible fashion. For explanatory purposes only, a value for a quality metric 158 is also referred to herein as a "quality metric value," "a quality metric score," and "a score for the quality metric 158."

In alternate embodiments, the quality metric list 156 may include any number and type of quality metrics 158. In the same or other alternate embodiments, the quality metric list 156 may not specify the baseline quality metric 158. Instead, the encoder configuration application 150 may select one of the quality metrics 158 as the baseline quality metric 158 in any technically feasible fashion.

For explanatory purposes only, FIG. 1 depicts exemplary values for each of the quality metrics 158 included in the quality metric list 156. As shown the quality metric 158(0) is a harmonic video multimethod assessment fusion ("HVMAF") metric, the quality metric 158(1) is a linear video multimethod assessment fusion ("LVMAF") metric, the quality metric 158(2) is a classic PSNR ("CPSNR") metric, and the quality metric 158(3) is a true PSNR ("TPSNR") metric.

The HVMAF and LVMAF metrics are based on video multimethod assessment fusion ("VMAF"). In VMAF, machine learning techniques are used to institute a consistent perceptual quality metric based on subjective scores assigned by viewers when viewing reconstructed training video content derived from encoded versions of training video content. A trained machine learning model computes a VMAF score (i.e., a value for a VMAF metric) for each frame of encoded video content based on spatial features associated with various image-based quality metrics and temporal feature(s). The values for the features are computed based on the encoded video content and the source video content from which the encoded video content was derived.

HVMAF and LVMAF are associated with different techniques for aggregating per-frame VMAF values. More precisely, HVMAF scores and VMAF scores can be computed based on, respectively, the following equations (1) and (2).

$$HVMAF = \frac{N}{\sum_{n=0}^{N-1} \frac{1}{1 + VMAF_n}} - 1 \quad (1)$$

$$LVMAF = \frac{1}{N} \sum_{n=0}^{N-1} VMAF_n \quad (2)$$

In equation (1), HVMAF denotes the HVMAF score for a sequence of frames. In equation (2), LVMAF denotes the LVMAF score for a sequence of frames. In both equations (1) and (2), N is the total number of frames in the sequence of frames, n specifies a frame number, $VMAF_n$ specifies the VMAF score for the $n^{th}$ frame in the sequence.

CPSNR and TPSRN are associated with different techniques for aggregating per-frame PSNR scores. The CPSNR score for a sequence of frames is the arithmetic average of the PSRN scores for each frame included in the sequence of frames. By contrast, the TPSNR score for a sequence of frames is the arithmetic average of mean-squared-error values for the Y/Cb/Cr component of each frame, properly weighted by the number of pixels in each component and expressed in Decibels.

As shown, the target quality list 152 includes, without limitation, target quality scores 154(0)-154(11). Each of the target quality scores 154 is a different score for the baseline quality metric 158(0). Since the baseline quality metric 158(0) is HVMAF, each of the target quality scores 154 is a different HVMAF score. In alternate embodiments, the target quality list 152 may include any number of target quality scores 154. In the same or other alternate embodiments, each target quality score 154 may specify a score for any one of the quality metrics 158 in any technically feasible fashion.

For explanatory purposes only, FIG. 1 depicts exemplary values for each of the target quality scores 154. Because the baseline quality metric 158(0) is HVMAF, each of the target quality scores 154 is a different HVMAF score. As a general matter, valid HVMAF scores range from 0 to 100, where the estimated human-perceived visual quality increases as the HVMAF score increases. As shown, the target quality scores 154(0)-154(11) are, respectively, 36, 42, 48, 54, 60, 66, 72, 78, 84, 90, 96. The target quality scores 154 are spaced at intervals of 6 to reflect empirical results indicating that a just-noticeable-difference in human-perceived visual quality corresponds to a VMAF difference of 6. Further, the target quality score 154(0) of 36 reflects an empirically determined lowest acceptable visual quality and the target quality score 154(11) of 96 reflects an empirically determined visual quality that is close to perceptually perfect visual quality. In alternate embodiments, the target quality scores 154 may be determined in any technically feasible fashion.

As shown, the encoder comparison application 150 includes, without limitation, a shot analyzer 126, a shot set 130, instances of the iterative dynamic optimizer 140, a comparison engine 180, and a BD-rate dataset 190. More precisely, the encoder comparison application 150 includes a different instance of the iterative dynamic optimizer 140 for each of the configured encoders 162.

Upon receiving the source video sequence 122, the shot analyzer 126 identifies one or more shot changes (not shown) included in the source video sequence 122. Each of the shot changes specifies a boundary between a different pair of the shot sequences 132. The shot analyzer 126 may identify the one or more shot changes in any technically feasible fashion.

For instance, in some embodiments, the shot analyzer 126 transmits the source video sequence 122 to a shot detector 124. To determine the shot changes, the shot detector 124 executes any number of shot detection algorithms based on the source video sequence 122. Some examples of shot detection algorithms include, without limitation, a multi-scale sum-of-absolute-differences algorithm, a motion-compensated residual energy algorithm, a histogram of differences algorithm, a difference of histograms algorithm, and so forth. The shot detector 124 then transmits the shot changes to the shot analyzer 126. In alternate embodiments, the shot analyzer 126 may perform any number of shot detection operations on the source video sequence 122 to identify the shot changes.

The shot analyzer 126 performs partitioning operations on the source video sequence 122 based on the shot changes to determine the shot sequences 132. In some embodiments, the shot analyzer 126 may also remove extraneous pixels from the source video sequence 122. For example, the shot analyzer 126 could remove pixels included in black bars along border sections of the source video sequence 122. Subsequently, the shot analyzer 126 generates the shot set 130 that includes the shot sequences 132.

In various embodiments, the iterative dynamic optimizer 140 ensures that the initial frame of each shot sequence 132 is encoded as a key frame during encoding operations. As a general matter, a "key frame" and all subsequent frames from the same shot sequence 132 that are included in an encoded version of the shot sequence 132 are decoded independently of any proceeding frames included in the encoded version of the shot sequence 132. The iterative dynamic optimizer 140 may ensure that the different initial frames of the different shot sequences 132 are encoded as key frames in any technically feasible fashion. For instance, in some embodiments, the iterative dynamic optimizer 140 configures each of the configured encoders 162 to encode frames as key frames based on a key frame location list (not shown) when encoding video content. In other embodiments, the iterative dynamic optimizer 140 may perform any number of encoding operations to encode the different initial frames of the different shot sequences 132 as key frames when encoding video content.

As persons skilled in the art will recognize, during playback, a video title associated with the source video sequence 122 is switchable between decoded versions of different encoded versions of the source video sequence 122 at aligned key frames to optimize a viewing experience based on any number of relevant criteria. Examples of relevant criteria include the current connection bandwidth, the current connection latency, the content of the upcoming shot sequence 132, and the like.

In alternate embodiments, the encoder comparison application 150, the iterative dynamic optimizer 140, the shot analyzer 126, and/or the shot detector 124 may be configured to partition the source video sequence 122 into subsequences that are not necessarily equivalent to the shot sequences 132 in any technicality feasible fashion. A subsequence may represent a variety of different constructs, including a group of pictures ("GOP"), a sequence of frames, a plurality of sequences of frames, and so forth.

For instance, in various embodiments, one or more of the encoding comparison application 150, the iterative dynamic optimizer 140, and the shot analyzer 126 may be configured to identify subsequences for which a consistency metric lies within a specified range. In a complementary fashion, the iterative dynamic optimizer 140 may be configured to operate on subsequences and encoded subsequences instead of the shot sequences 132 and encoded shot sequences.

After generating the shot set 130, the encoder comparison application 150 configures each instance of the iterative dynamic optimizer 140($x$) to generate an encoder dataset 170($x$) based on the configured encoder 162($x$), the shot set 130, the quality metric list 156, and the target quality list 152. In general, the iterative dynamic optimizer 140($x$) performs shot-based encoding using the configured encoder 162($x$) and the shot sequences 132 to generate a different target encoded video sequence for each combination of quality metric 158 and target quality score 154. Because the total number of quality metrics 158 is four and the total number of target quality scores 154 is twelve, the iterative dynamic optimizer 140($x$) computes forty-eight different optimized encoded video sequences. Each of the target encoded video sequences includes, without limitation, S+1 encoded shot sequences that are associated, respectively, with the shot sequences 132(0)-132(S).

As described in greater detail in conjunction with FIGS. 2-6, the iterative dynamic optimizer 140($x$) generates the target encoded video sequences in an iterative process that optimizes each of the encoded shot sequences included in the target encoded video sequences. For each iteration, the iterative dynamic optimizer 140($x$) generates encoded shot sequences based on the shot sequences 132 and, for each shot sequence 132 an encoding list. Each encoding list specifies any number of encoding points, where each encoding point included in a given encoding list specifies a different combination of resolution and a value for an encoding parameter.

For each quality metric 158($y$), the iterative dynamic optimizer 140($x$) configures a different instance of a dynamic optimizer to generate a global convex hull of video encode points based on the encoded shot sequences. Each video encode point includes, without limitation, a shot encode sequence that specifies a different encoded shot sequence for each shot sequence. Each video encode point also includes, an encoded video sequence corresponding to the shot encode sequence, an overall quality score for encoded video sequence computed based on the associated quality metric 158(y), and an overall bitrate for the encoded video sequence. In general, the dynamic optimizer generates the global convex hull of video encode points that, for the source video sequence 122, minimize the bitrate for different quality scores as per the quality metric 158 associated with the dynamic optimizer.

Figure 6:
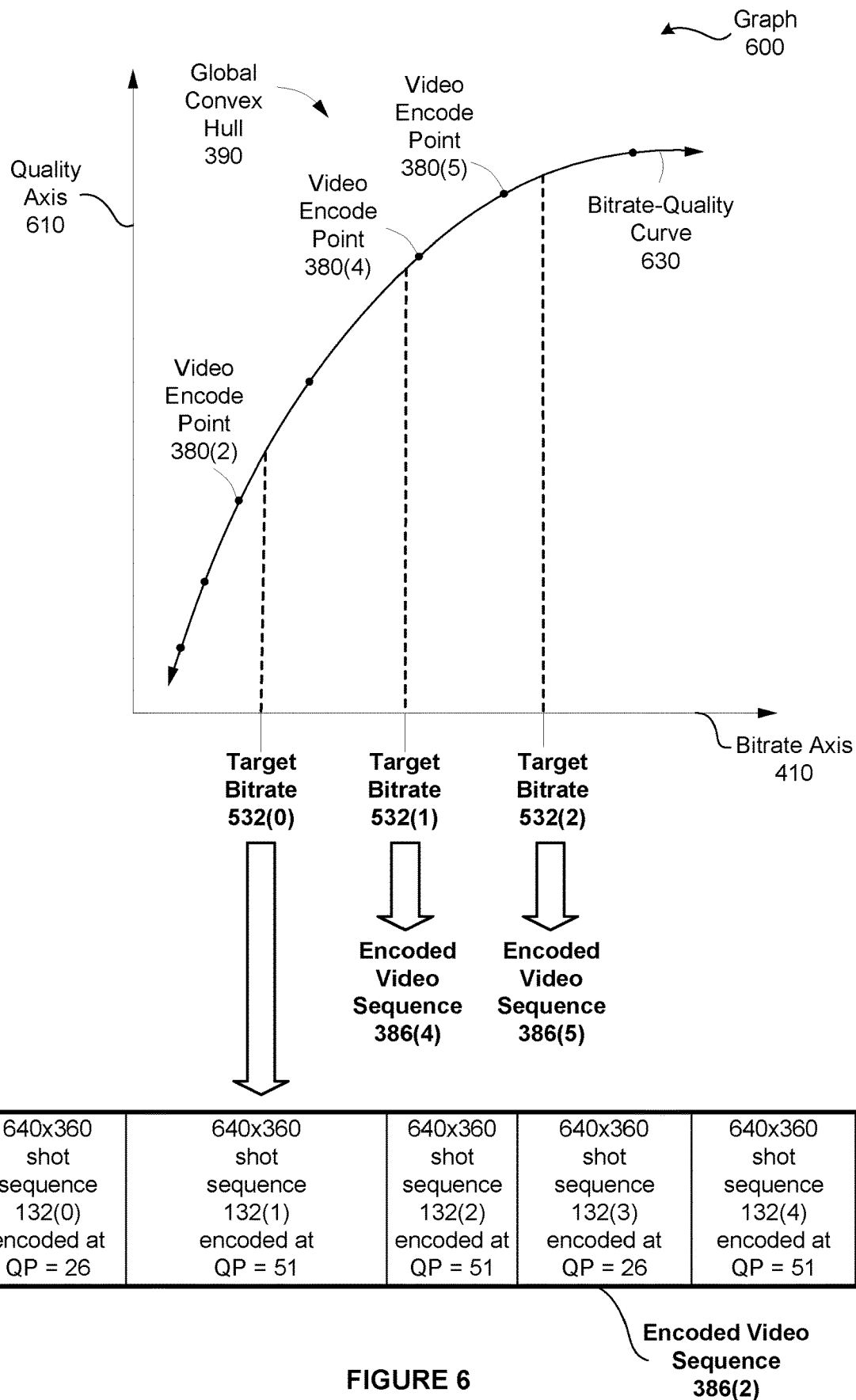
FIG. 6 illustrates an exemplary global convex hull that is generated by the dynamic optimizer of FIG. 2 using the video encode points shown in FIGS. 4A-4D, according to various embodiments.

As illustrated in FIG. 6 and as persons skilled in the art will recognize, the video encode points included in a given global convex hull can be connected to generate a bitrate-quality curve. The bitrate-quality curve represents the quality score for the quality metric 158 associated with the global convex hull as a function of the bitrate across all the encoded video sequences associated with the global convex hull. According, each global convex hull can be used to map bitrates to quality scores and, conversely, quality scores to bitrates.

Figure 5:
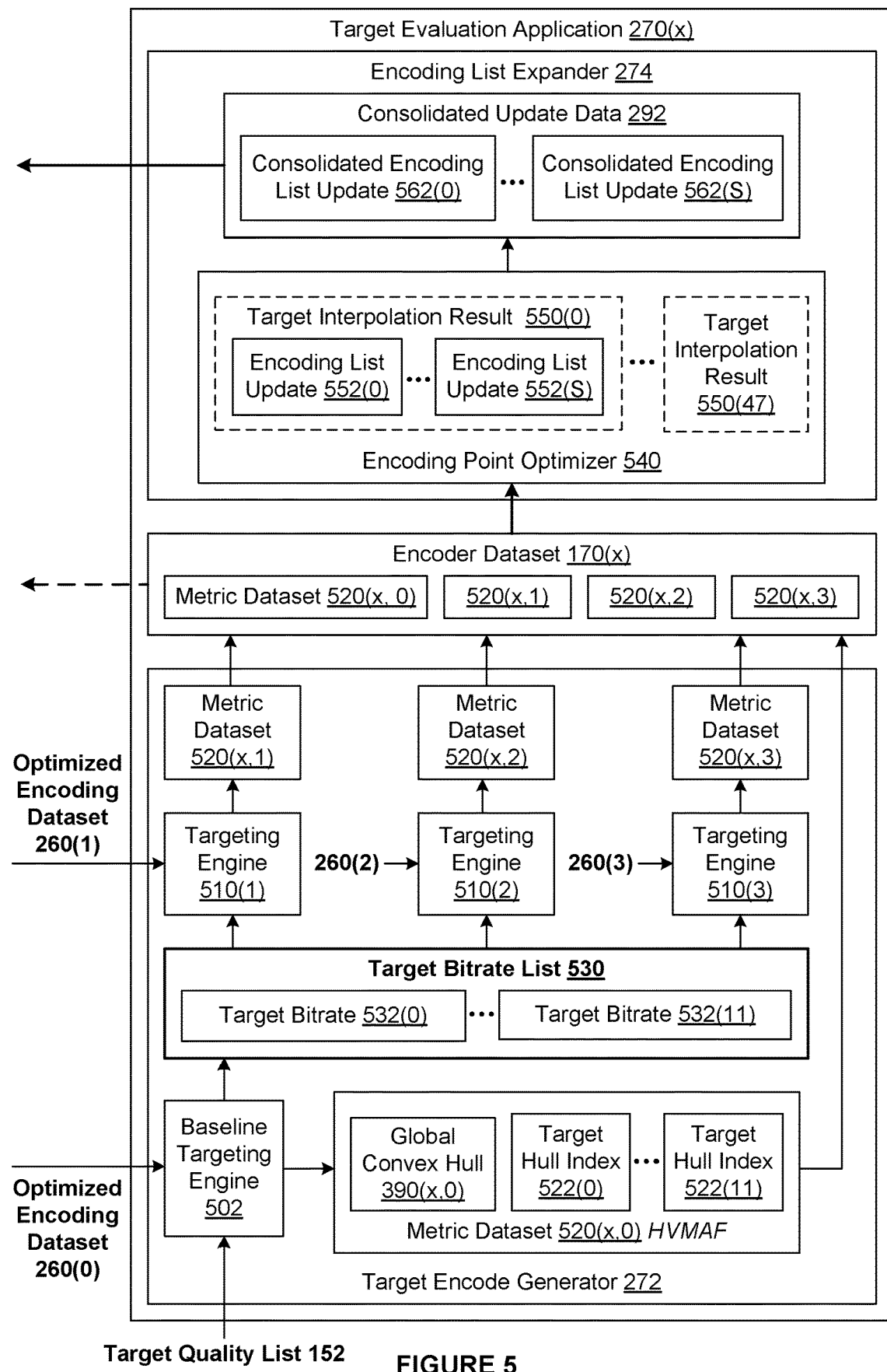
FIG. 5 is a more detailed illustration of the target evaluation application of FIG. 2, according to various embodiments.

As described in greater detail in conjunction with FIG. 5, a target evaluation application (not shown in FIG. 1) included in the iterative dynamic optimizer 140(x) evaluates each of the global convex hulls based on the target quality list 152 to determine different target encoded video sequences. For each quality metric 158, the target evaluation application generates a different metric dataset (not shown) that specifies the associated global convex hull and the associated target encoded video sequences. The target evaluation application then generates the encoder dataset 170(x) that includes, without limitation, the metric datasets associated with the configured encoder 162(x).

Subsequently, the target evaluation application determines whether the iterative dynamic optimizer 140(x) is to continue iterating based on whether there is any improvement in the target encoded video sequences compared to the previous iteration. If the target evaluation application determines that there is no improvement, then the target evaluation application transmits the encoder dataset 170(x) to the iterative dynamic optimizer 140(x) and the iterative dynamic optimizer 140(x) ceases to iterate. In alternate embodiments, the target evaluation application or the iterative dynamic optimizer 140(x) may determine when the iterative dynamic optimizer 140(x) is to cease iterating based on any number and type of criteria.

If the target evaluation application determines that there is improvement between iterations, then the target evaluation application generates consolidated update data that specifies one or more new encoding points. The iterative dynamic optimizer 140(x) adds the new encoding points to one or more of the encoding lists to initiate a new iteration. The iterative dynamic optimizer 140(x) generates new encoded shot sequences based on the new encoding points and then configures the instances of the dynamic optimizer to regenerate the global convex hulls based on all of the encoded shot sequences.

When all of the iterative dynamic optimizers 140 have ceased iterating, the comparison engine 180 computes various different BD-rates based on the global convex hulls included in the encoder datasets 170. In some embodiments, and as described in greater detail in conjunction with FIG. 7, the comparison engine 180 performs any number of mapping operations using the global convex hulls associated with the baseline configured encoder 162(0) to determine a low quality range and a high quality ranges for each of the different quality metrics 158. The comparison engine 180 also defines a full quality range for each quality metric 158 that includes all valid scores for the quality metric 158.

Subsequently, the comparison engine 180 compares portions of the global convex hull associated with the different quality ranges to compute three different BD-rate values for each combination of non-baseline configured encoder 162 and quality metric 158. Each BD-rate value specifies a performance difference between the associated non-baseline configured encoder 162 and the baseline-configured encoder 162 for the associated quality metric 158 over the associated quality range. The comparison engine 180 then generates the BD-rate matrix 190 that includes, without limitation, the BD-rate values. The comparison engine 180 then displays and/or transmits the BD-rate matrix 190 to any number of applications to provide insights into the performance of the different configured encoders 162.

It will be appreciated that the system 100 shown herein is illustrative and that variations and modifications are possible. For example, the functionality provided by encoder comparison application 150, the iterative dynamic optimizer 140, the comparison engine 180, and the shot analyzer 126 as described herein may be integrated into or distributed across any number of software applications (including one), hardware devices (e.g., a hardware-based encoder), and any number of components of the system 100. Further, the connection topology between the various units in FIG. 1 may be modified as desired.

Figure 2:
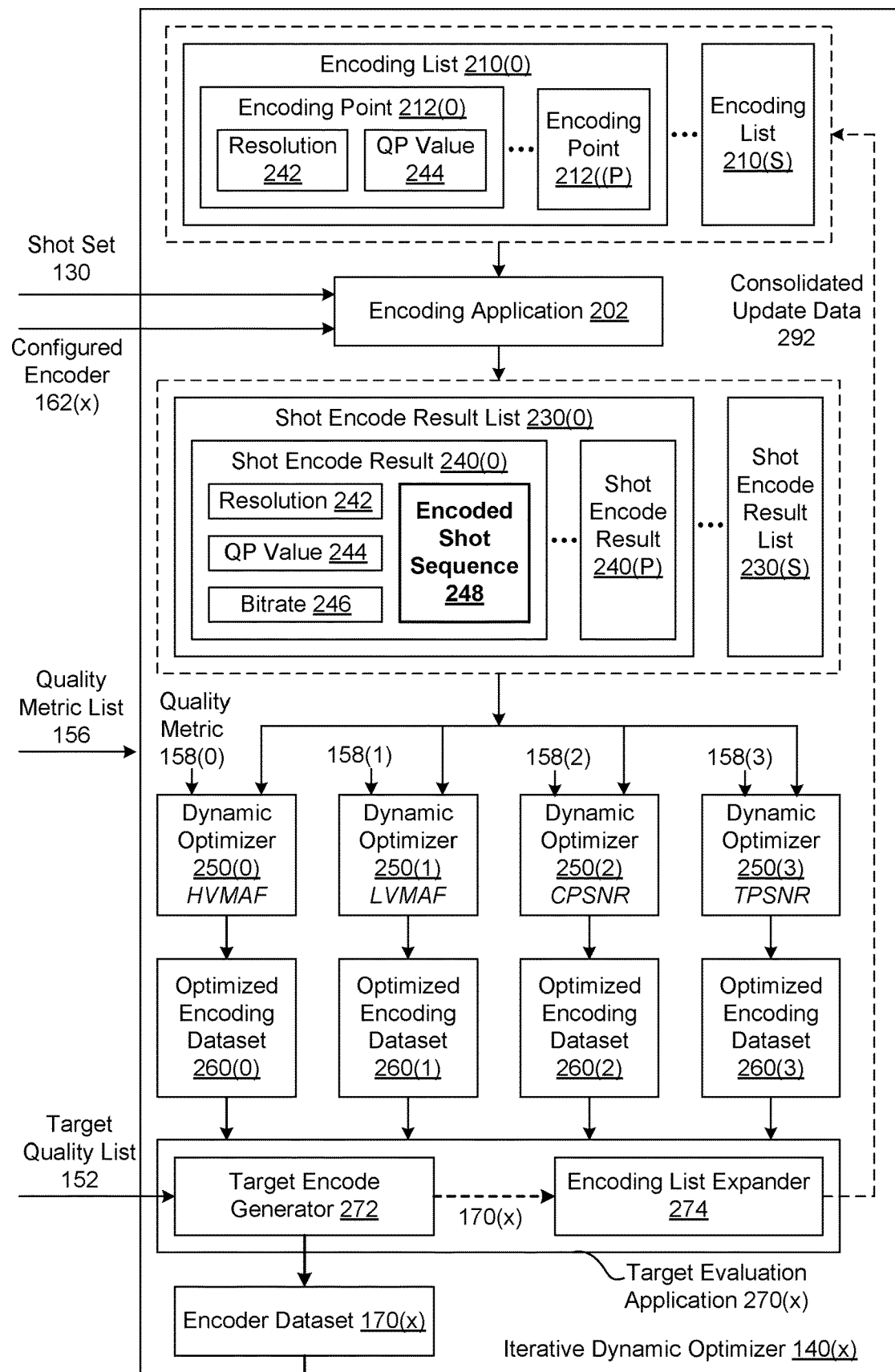
FIG. 2 is a more detailed illustration of the iterative dynamic optimizer of FIG. 1, according to various embodiments.

FIG. 2 is a more detailed illustration of the iterative dynamic optimizer 140 of FIG. 1, according to various embodiments. For explanatory purposes only, FIG. 2 depicts the iterative dynamic optimizer 140(x) associated with the configured encoder 162(x). As shown, the iterative dynamic optimizer 140(x) includes, without limitation, encoding lists 210(0)-210(S), an encoding application 202, shot encode result lists 230(0)-230(S), instances of a dynamic optimizer 250, optimized encoding datasets 260(1)-260(3), a target evaluation application 270(x), and the encoder dataset 170(x).

As described previously in conjunction with FIG. 1, the total number of the shot sequences 132 is (S+1) and the total number of quality metrics 158 is four. In general, the total number the encoding lists 210 and the total number of the shot encode result lists 230 are both equal to the total number of the shot sequences 132. Further, the encoding list 210(x) and the shot encode result list 230(x) are associated with each other and the shot sequence 132(x).

The total number of instances of the dynamic optimizer 250 and the total number of the optimized encoding datasets 260 are both equal to the total number of quality metrics 158. The dynamic optimizer 250(y) and the optimized encoding dataset 260(y) are associated with each other and the quality metric 158(y). In various embodiments, the total number of quality metrics 158 included in the quality metric list 156 may be an integer Q, where Q is greater than or equal to one, and the total number of the instances of the dynamic optimizer 250 and the total number of the optimized encoding datasets 260 are also equal to Q.

As shown, each of the encoding lists 210 includes, without limitation, any number of encoding points 212. In general, the number of encoding points 212 included in the encoding list 210(a) may vary from the number of encoding points 212 included in the encoding list 210(b). Each encoding point 212 includes, without limitation, a resolution 242 and a quantization parameter ("QP") value 244. The quantization parameter allows a monotonic performance in terms of bitrate and quality when encoding video content. The higher the QP value, the lower the resulting bitrate at the expense of lower quality. In alternate embodiments, the QP value 244 may be replaced or supplemented by values for any number and type of encoding parameters.

Each of the encoding points 212 in the encoding list 210(a) specifies a different combination of the resolution 242 and the QP value 244. Initially, for each shot sequence 132(s), the iterative dynamic optimizer 140 generates the encoding list 210(s) that includes a relatively sparse selection of the encoding points 212. Subsequently, the target evaluation application 270 iteratively increases the number of encoding points 212 included in one or more of the encoding lists 210 in order to efficiently converge to encoded video sequences that best match the target quality scores 154.

In alternate embodiments, the iterative dynamic optimizer 140 may be replaced with a "full configuration dynamic optimizer" that generates a global encoding list that includes a relatively dense set of the encoding points 212. The full configuration dynamic optimizer does not iterate and instead configures the dynamic optimizer 250 to generate the final global convex hulls based on the global encoding list.

The iterative dynamic optimizer 140 may initialize the encoding lists 210 in any technically feasible fashion. In some embodiments the iterative dynamic optimizer 140 initializes the encoding lists 210 based on a fixed set of resolutions 242 and the configured encoder 162(x). For instance, in various embodiments, for each encoding list 210, the iterative dynamic optimizer 140 generates the encoding point 212(0) specifying a minimum resolution 242 and the maximum QP value 244 allowed by the configured encoder 162(x). The iterative dynamic optimizer 140 then generates the encoding point 212(1) specifying the minimum resolution 242 and the middle QP value 244 allowed by the configured encoder 162(x). For each additional resolution 242 that lies in between the maximum resolution 242 and the minimum resolution 242, the iterative dynamic optimizer 140 generates the encoding point 212 specifying the resolution 242 and the middle QP value 244. The iterative dynamic optimizer 140 then generates the encoding point 212 specifying the maximum resolution 242 and the middle QP value 244. Finally, the iterative dynamic optimizer 140 generates the encoding point 212 specifying the maximum resolution 242 and the minimum QP value 244 allowed by the configured encoder 162(x).

To initiate each iteration, the iterative dynamic optimizer 140 evaluates the encoding lists 210 to identify new encoding points 212. For each encoding list 210(s), a "new" encoding point 212 is an encoding point 212 for which the iterative dynamic optimizer 140(x) has not previously encoded the shot sequence 132(s) to generate an encoded shot sequence 248 associated with the encoding point 212. For each new encoding point 212 included in the encoding list 210(s), the iterative dynamic optimizer 140(x) configures the encoding application 202 to encode the shot sequence 132(s) based on the encoding point 212 and using the configured encoder 162(x) to generate the associated encoded shot sequence 248.

The encoding application 202 may generate the encoded shot sequences 248 in any technically feasible fashion that is consistent with the configured encoded 162(x). Further, as a general matter, the encoding application 202 may generate encoded video content derived from video content based on a given resolution 242 and given encoding parameter value (e.g., the QP value 244) in any technically feasible fashion. For instance, in some embodiments, the encoding application 202 performs sampling operations on the video content based on the resolution 242 to generate sampled video content. Subsequently, the encoding application 202 causes the configured encoder 162(x) to encode the sampled video content using the encoding parameter value(s) to generate the encoded shot sequence 248.

In various embodiments, the encoding application 202 resides in a cloud and is configured to efficiently perform encoding operations via one or more parallel encoders that implement the configured encoder 162(x). Each of the parallel encoders may include any number of compute instances 110. In alternate embodiments, the iterative dynamic optimizer 140(x) may perform encoding operations directly using the configured encoder 162(x) and the iterative dynamic optimizer 140(x) may omit the encoding application 202. In the same or other embodiments, the iterative dynamic optimizer 140(x) may include a sampling application, and the iterative dynamic optimizer 140(x) may configure the sampling application to perform sampling operations.

The iterative dynamic optimizer 140(x), the encoding application 202, and/or the configured encoder 162(x) may perform sampling operations and encoding operations at any level of granularity (e.g., per frame, per shot sequence 132, per source video sequence 122, etc.) in any combination and in any technically feasible fashion. For instance, in some embodiments, the iterative dynamic optimizer 140(x) may perform sampling operations on the source video sequence 122 based on a given resolution 242 to generate a sampled video sequence. Subsequently, for each of the encoding points 212 that specifies the resolution 242, the iterative dynamic optimizer 140(x) may configure the configured encoder 162(x) to encode the sampled video content corresponding to the associated shot sequence 132 using the associated QP values 244.

After generating a new encoded shot sequence 248, the iterative dynamic optimizer 140(x) computes a bitrate 246 based on the encoded shot sequence 248. The iterative dynamic optimizer 140(x) may compute the bitrate 246 in any technically feasible fashion. For instance, in some embodiments, the iterative dynamic optimizer 140(x) may divide the total number of bits needed for the resolution 242 by the length of the associated shot sequence 132. For each new encoded shot sequence 248, the iterative dynamic optimizer 140(x) generates a shot encode result 240 that includes, without limitation, the encoded shot sequence 248, the resolution 242, the QP value 244, and the bitrate 246.

Subsequently, for each of the shot sequences 132(s), the iterative dynamic optimizer 140(x) adds the new shot encode results 240 associated with the shot sequence 132(s), to the shot encode result list 230(s). In this fashion, the iterative dynamic optimizer 140(x) ensures that the shot encode result list 230(s) includes, without limitation, a different shot encode result 240 for each of the encoding points 212 included in the shot encode list 210(s).

For each of the quality metrics 158(y) included in the quality metric list 156, the iterative dynamic optimizer 140 configures the dynamic optimizer 250(y) to generate the optimized encoding dataset 260 based on the quality metric 158(y), the shot encode result lists 230, and the shot set 130. As shown, the dynamic optimizer 250(0) generates the optimized encoding dataset 260(0) based on the quality metric 158(0) of HVMAF, the dynamic optimizer 250(1) generates the optimized encoding dataset 260(1) based on the quality metric 158(1) of LVMAF, the dynamic optimizer 250(2) generates the optimized encoding dataset 260(2) based on the quality metric 158(2) of CPSNR, and the dynamic optimizer 250(3) generates the optimized encoding dataset 260(3) based on the quality metric 158(3) of TPSNR.

Figure 3:
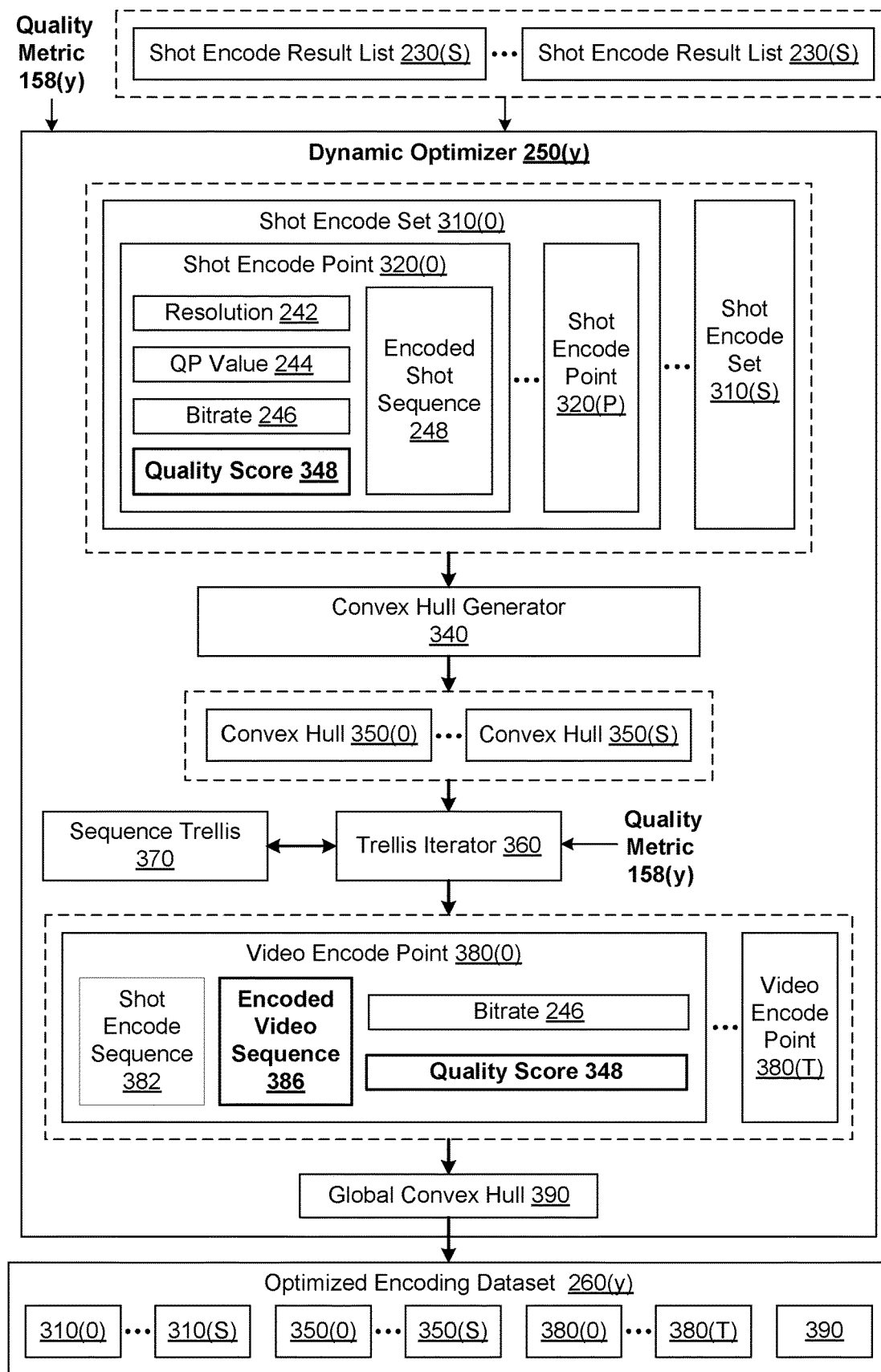
FIG. 3 is a more detailed illustration of the dynamic optimizer of FIG. 2, according to various embodiments.

As described in greater detail in conjunction with FIG. 3, to generate the global convex hull associated with both the configured encoder 162(x) and the quality metric 158(y), the dynamic optimizer 250(y) computes a different convex hull (not shown in FIG. 2) of shot encode points (not shown in FIG. 2) for each of the shot sequences. For each encoded shot sequence 248, a corresponding shot encode point includes the encoded shot sequence 248, the resolution 242, the QP value 244, the bitrate 246, and a quality score for the encoded shot sequence 248 that the dynamic optimizer 250(y) computes based on the quality metric 158(y). For each of the shot sequences 132(s), the dynamic optimizer 250(y) generates the associated convex hull that includes a subset of the shot encode points that, for the shot sequence 132(s), minimize the bitrate 246 for different quality scores as per the quality metric 158(y).

The dynamic optimizer 250(y) then performs optimization operations across the convex hulls to generate the global convex hull of video encode points that, for the source video sequence 122, minimize the bitrate 246 for different quality scores as per the quality metric 158(y). Finally, the dynamic optimizer 250(y) generates the optimized encoding dataset 260(y) that includes, without limitation, the shot encode points, the convex hulls, the video encode points, and the global convex hull.

As described in greater detail in conjunction with FIG. 5, the target evaluation application 270(x) evaluates the optimized encoding datasets 260 based on the target quality list 152. As shown, the target evaluation application 270 includes, without limitation, a target encode generator 272 and an encoding list expander 274. For each combination of global convex hull and target quality score 154 included in the target quality list 152, the target encode generator 272 selects the encoded video sequence included in the global convex hull that best matches the target quality score 154 as an associated target encoded video sequence. Accordingly, because the total number of target quality scores 154 is twelve and the total number of quality metrics 158 is four, the target evaluation application 270(x) identifies forty-eight different target encoded video sequences.

As outlined in conjunction with FIG. 1 and described in detail in conjunction with FIG. 5, the target encode generator 272 then generates the encoder dataset 170(x). The target encode generator 272 evaluates the encoder dataset 170(x) to determine whether there are any changes since the previous iteration. If the target encode generator 272 determines that there are no changes, then the target encode generator 272 transmits the encoder dataset 170(x) to the comparison engine 180 and the iterative dynamic optimizer 140(x) ceases to iterate.

Otherwise, the target encode generator 272 transmits the encoder dataset 170(x) to the encoding list expander 274. The encoding list expander 274 evaluates the encoder dataset 170(x) to determine one or more new encoding points 212. The encoding list expander 274 then generates consolidated update data 292 that specifies the new encoding points 212 and transmits the consolidated update data 292 to the iterative dynamic optimizer 140(x). The iterative dynamic optimizer 140(x) then adds the new encoding points 212 to the associated encoding points lists 210 and the iterative dynamic optimizer 140(x) initiates a new iteration.

Generating Different Encoded Video Sequences

FIG. 3 is a more detailed illustration of the dynamic optimizer 250 of FIG. 2, according to various embodiments. For explanatory purposes only, FIG. 3 depicts the dynamic optimizer 250(y) that is associated with both the quality metric 158(y) and the configured encoder 162(x). As shown, the dynamic optimizer 250(y) includes, without limitation, shot encode sets 310(0)-310(S), a convex hull generator 340, convex hulls 350(0)-350(S), a trellis iterator 360, a sequence trellis 370, any number of video encode points 380, a global convex hull 390, and the optimized encoding dataset 260(x).

The dynamic optimizer 250(y) generates the optimized encoding dataset 260(x) based on the shot encode result lists 230(0)-230(S). The total number of the shot encode result lists 230, the total number of the shot encode sets 310, and the total number of the convex hulls 350 is equal to the total number of the shot sequences 132. In general, the shot sequence 132(s) is associated with all of the shot encode result list 230(s), the shot encode set 310(s) and the convex hull 350(s).

Each of the shot encode sets 310 includes, without limitation, any number of shot encode points 320. The number of the shot encode points 320 included in the shot encode set 310(s) may differ from the number of shot encode points 320 included in any of the other shot encode sets 310. In operation, for the shot encode result list 230(s), the dynamic optimizer 250(y) determines which (if any) of the shot encode results 240 are not represented by the shot encode set 310(s). For each "new" shot encode result 240 included in the shot encode result list 230(s), the dynamic optimizer 250(y) generates a new shot encode point 320 based on the shot encode result 240. The dynamic optimizer 250(y) then adds the new shot encode point 320 to the associated shot encode set 310(s).

To generate the new shot encode point 320 based on the shot encode result 240, the dynamic optimizer 250(y) copies the resolution 242, the QP value 244, the bitrate 246, and the encoded shot sequence 248 included in the shot encode result 240 to a new shot encode point 320. The dynamic optimizer 250(y) then computes a quality score 348 for the encoded shot sequences 248 based on the quality metric 158(y) and then adds the quality score 348 to the new shot encode point 320. Accordingly, each the shot encode points 320 includes, without limitation, the resolution 242, the QP value 244, the bitrate 246, the encoded shot sequence 248, and the quality score 348.

The dynamic optimizer 250(y) may compute the quality score 348 in any technically feasible fashion. In some embodiments, to determine the quality score 348 associated with the encoded shot sequence 248, the dynamic optimizer 250(y) decodes the encoded shot sequence 248 to generate a decoded shot sequence. The dynamic optimizer 250(y) then re-samples (i.e., up-samples or down-samples) the decoded shot sequence to a target resolution to generate a re-constructed shot sequence that is relevant to the display characteristics of a class of endpoint devices.

The dynamic optimizer 250(y) then analyzes the re-constructed shot sequence to generate the quality score 348 for the quality metric 158(y). Although a multitude of video quality metrics 158 can be calculated at different target resolutions, it should be clear that, when comparing the quality scores 348 among encoded shot sequences 248 associated with different resolutions 242, applications need to use the same target resolution for re-sampling, after decoding. For instance, in some embodiments, the dynamic optimizer 250(y) re-samples the decoded shot sequence to 1920×1080 to generate the re-constructed shot sequence. Subsequently, the dynamic optimizer 250(y) computes the quality score 348 for the encoded shot sequence 248 based on the associated re-constructed shot sequence and the quality metric 158(y).

For each of the shot sequences 132(s), the convex hull generator 340 generates the convex hull 350(s) based on the shot encode set 310(s). Each of the convex hulls 350(s) includes, without limitation, the shot encode points 320 included in the shot encode set 310(s) that minimize bitrate for a given quality score as per the quality metric 158(y). Persons skilled in the art will understand that many techniques for generating convex hulls are well known in the field of mathematics, and all such techniques may be implemented to generate the convex hulls 350. For instance, in some embodiments, the convex hull generator 340 applies machine-learning techniques to estimate the shot encode points 320 included in the convex hull 350(s) based on various parameters of the associated source video sequence 122.

In other embodiments, the convex hull generator 340 distributes the shot encode points 320 included in the shot encode set 310(s) into different subsets based on the resolution 242. Subsequently, for each resolution-specific subset, the convex hull generator 340 plots each of the shot encode points 320 by locating the bitrate 246 along a bitrate axis and the quality score 348 along a quality axis to generate a corresponding per-shot bitrate-quality curve. In this fashion, the convex hull generator 340 generates any number of per-shot bitrate-quality curves, where each of the per-shot bitrate-quality curves corresponds to a different resolution 242 and includes one or more shot encode points 320.

After generating the per-shot bitrate-quality curves, the convex hull generator 340 evaluates the shot encode points 320 along the per-shot bitrate-quality curves to determine the convex hull 350(s). More specifically, the convex hull generator 340 identifies the shot encode points 320 across all the per-shot bitrate-quality curves that form a boundary where all the shot encode points 320 reside on one side of the boundary and also are such that connecting any two consecutive identified shot encode points 320 with a straight line leaves all remaining shot encode points 320 on the same side. The convex hull 350(s) includes the set of the identified shot encode points 320.

As shown, the trellis iterator 360 receives the convex hulls 350 and then iteratively updates a sequence trellis 370 to generate any number of video encode points 380. The trellis iterator 360 is a software module, and the sequence trellis 370 is a data structure that is described in greater detail below in conjunction with FIGS. 4A-4D.

Each of the video encode points 380 includes, without limitation, a shot encode sequence 382, an encoded video sequence 386, the bitrate 246, and the quality score 348. The shot encode sequence 382 includes, without limitation, S+1 shot encode points 320—a different shot encode point 320 for each of the shot sequences 132. The encoded video sequence 386 includes, without limitation, the S+1 encoded shot sequences 248 included in the S+1 shot encode points 320 included in the shot encode sequence 382. The bitrate 246 and the quality score 348 specify, respectively, a global bitrate and a global quality score as per the quality metric 158(y) for the encoded video sequence 386.

As described in greater detail in conjunction with FIGS. 4A-4D, the trellis iterator 360 generates the video encode points 380. Subsequently, the dynamic optimizer 250(y) generates the global convex hull 390 based on the video encode points 380. After generating the global convex hull 390, the dynamic optimizer 250(y) transmits the optimized encoding dataset 260(y) to the iterative dynamic optimizer 140(x) of FIG. 2. As shown, the optimized encoding dataset 260(y) includes, without limitation, the shot encode sets 310, the convex hulls 350, the video encode points 380, and the global convex hull 390.

FIGS. 4A-4D are more detailed illustrations showing how the trellis iterator 360 of FIG. 3 assembles the encoded shot sequences 248 into the encoded video sequences 386, according to various embodiments. As shown in FIGS. 4A-4D, the sequence trellis 370 includes, without limitation, a shot axis 420 and a bitrate axis 410. The sequence trellis 370 also includes, without limitation, columns of the shot encode points 320 included in the convex hulls 350, where each column corresponds to a particular shot sequence 132. For example, the zeroth column included in the sequence trellis 370 corresponds to the shot encode points 320 included in the convex hull 350(0). The shot encode points 320 included in any column are ranked according to ascending bitrate 246 (and, by construction, ascending quality scores 348). The "hull" shot encode points 320 included in any column are also guaranteed to have positive slopes that—in magnitude—are increasing as a function of the bitrate 246.

For convenience, the hull shot encode points 320 are individually indexed according to the following system. For a given hull shot encode point 320, the first number is an index of the shot sequence 132, and the second number is an index into the bitrate ranking of those hull shot encode points 320. For example, the hull shot encode point 320 00 corresponds to the zeroth shot sequence 132(0) and the zeroth ranked bitrate 246. Similarly, the hull shot encode point 320 43 corresponds to the fourth shot sequence 132(4) and the third-ranked bitrate 246 (in this case the highest-ranked bitrate 246).

As previously described in conjunction with FIG. 3, each hull shot encode point 320 included within the sequence trellis 370 includes a different encoded shot sequence 248. The trellis iterator 360 generates the encoded video sequences 386 by combining these encoded shot sequences 248. The trellis iterator 360 implements the sequence trellis 370 to iteratively perform this combining technique.

Figure 4A:
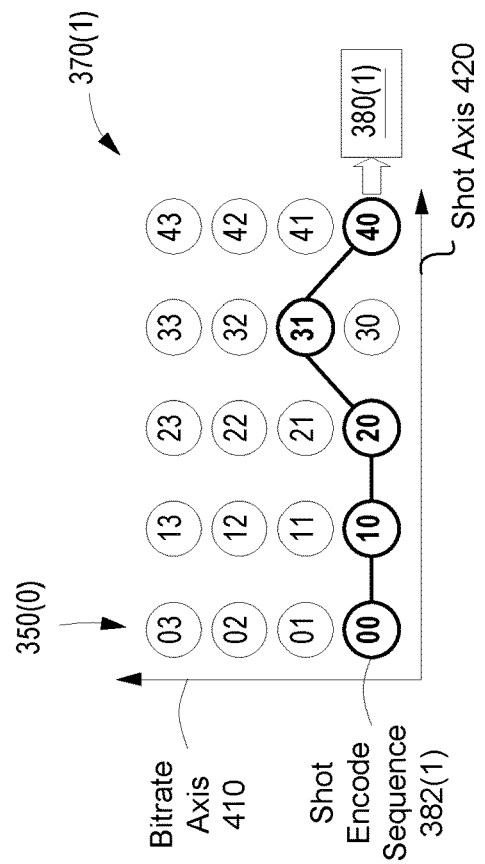
FIGS. 4A-4D are more detailed illustrations showing how the trellis iterator of FIG. 3 assembles encoded shot sequences into encoded video sequences, according to various embodiments.
Figure 4B:
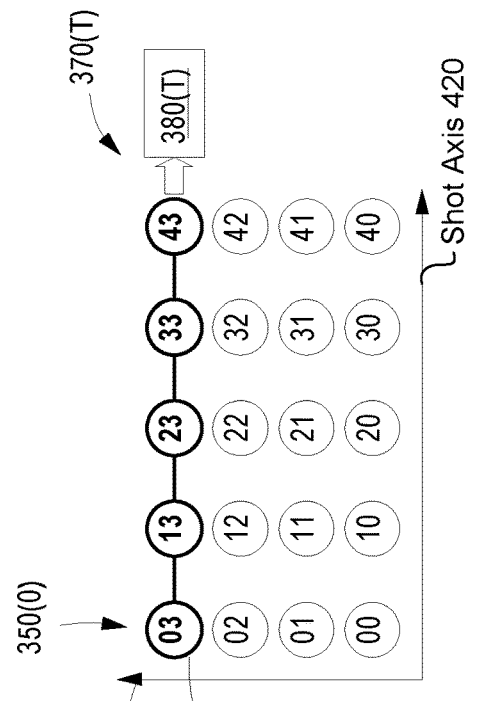

Each of FIGS. 4A-4D illustrates a different version of the sequence trellis 370 generated by the trellis iterator 360 at a different iteration. FIG. 4A illustrates the sequence trellis 370(0) in an initial state. Here, the trellis iterator 360 generates the shot encode sequence 382(0) that includes the hull shot encode points 320 00, 10, 20, 30, and 40. These initially selected hull shot encode points 320 have the lowest bitrate 246 and lowest quality scores 348, and therefore reside at the bottom of the respective columns.

The trellis iterator 360 generates the encoded video sequence 386(0) based on the shot encode sequence 382(0). More precisely, the trellis iterator 360 aggregates the encoded shot sequences 248 included in, sequentially, the hull shot encode points 00, 10, 20, 30, and 40 to generate the encoded video sequence 386(0). Subsequently, the trellis iterator 360 computes the bitrate 246 and the quality score 348 of the encoded video sequence 386(0). Notably, the trellis iterator 360 computes the quality score 348 based on the quality metric 158(y) associated with the shot encode points 320.

The trellis iterator 360 may compute the bitrate 246 and the quality score 348 of the encoded video sequence 386(0) in any technically feasible fashion that is consistent with the quality metric 158(y). The trellis iterator 360 then generates the video encode point 380(0) that includes, without limitation, the shot encode sequence 382(0), the encoded video sequence 386(0), the bitrate 246 of the encoded video sequence 386(0), and the quality score 348 of the encoded video sequence 386(0).

The trellis iterator 360 then computes, for each hull shot encode point 320 within the shot encode sequence 382(0), the rate of change of quality with respect to bitrate 246 between the hull shot encode point 320 and the above-neighbor of the hull shot encode point 320. For example, the trellis iterator 360 could compute the rate of change of quality with respect to bitrate 246 between nodes 00 and 01, 10 and 11, 20 and 21, 30 and 31, and 40 and 41. Notably, the computed rate of change for the hull shot encode point 320 that includes a particular encoded shot sequence 248 represents the derivative of the bitrate/quality curve associated with that shot sequence 132, taken at the hull shot encode point 320.

The trellis iterator 360 selects the derivative having the greatest magnitude, and then selects the above neighbor associated with that derivative for inclusion in a subsequent shot encode sequence 382. For example, in FIG. 4B, the trellis iterator 360 determines that the derivative associated with hull shot encode point 320 30 is greatest, and therefore includes hull shot encode point 320 31 (the above-neighbor of hull shot encode point 320 30) in the shot encode sequence 382(1). In particular, as shown, the trellis iterator 360 generates the shot encode sequence 382(1) that includes the hull shot encode points 320 00, 10, 20, 31, and 40.

The trellis iterator 360 then generates the encoded video sequence 386(1) based on the shot encode sequence 382(1). More precisely, the trellis iterator 360 aggregates the encoded shot sequences 248 included in, sequentially, the hull shot encode points 00, 10, 20, 31, and 40 to generate the encoded video sequence 386(1). Subsequently, the trellis iterator 360 computes the bitrate 246 and the quality score 348 of the encoded video sequence 386(1). The trellis iterator 360 then generates the video encode point 380(1) that includes, without limitation, the shot encode sequence 382(1), the encoded video sequence 386(1), the bitrate 246 of the encoded video sequence 386(1), and the quality score 348 of the encoded video sequence 386(1).

Figure 4C:
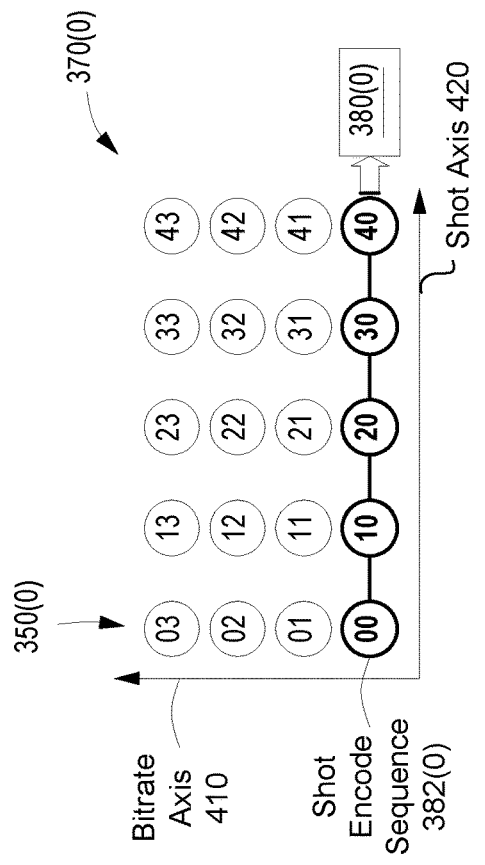
Figure 4D:
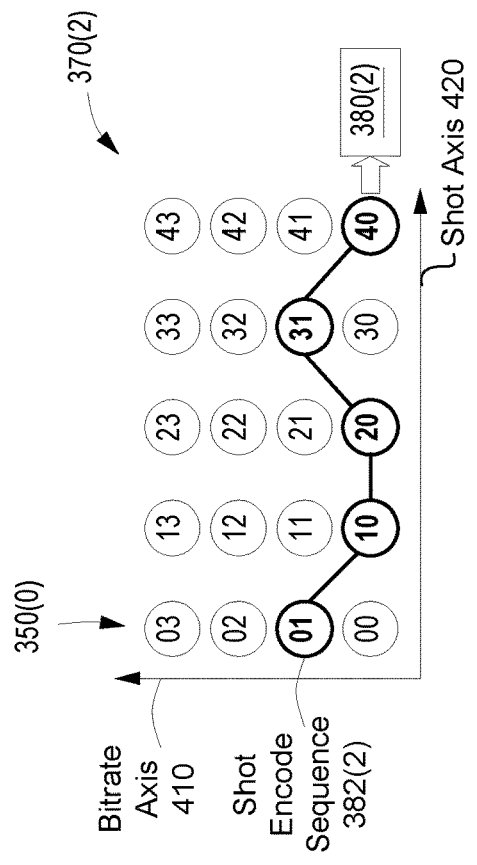

The trellis iterator 360 performs this technique iteratively, thereby ascending the sequence trellis 370, as shown in FIGS. 4C-4D. In FIG. 4C, the trellis iterator 360 determines that the derivative associated with the hull shot encode point 320 00 is greatest compared to other derivatives, and therefore selects the hull shot encode point 320 01 for inclusion in the shot encode sequence 382(2). As shown, the trellis iterator 360 generates the shot encode sequence 382(2) that includes the hull shot encode points 320 01, 10, 20, 31, and 40.

The trellis iterator 360 then generates the encoded video sequence 386(2) based on the shot encode sequence 382(2). More precisely, the trellis iterator 360 aggregates the encoded shot sequences 248 included in, sequentially, the hull shot encode points 01, 10, 20, 31, and 40 to generate the encoded video sequence 386(2). Subsequently, the trellis iterator 360 computes the bitrate 246 and the quality score 348 of the encoded video sequence 386(2). The trellis iterator 360 then generates the video encode point 380(2) that includes, without limitation, the shot encode sequence 382(2), the encoded video sequence 386(2), the bitrate 246 of the encoded video sequence 386(2), and the quality score 348 of the encoded video sequence 386(2).

The trellis iterator 360 continues this process until, as shown in FIG. 4D, generating the video encode point 380(T). The video encode point 380(T) includes, without limitation, the shot encode sequence 382(T), the encoded video sequence 386(T), the bitrate 246 of the encoded video sequence 386(T), and the quality score 348 of the encoded video sequence 386(T).

In this manner, the trellis iterator 360 incrementally improves the shot encode sequence 382 by selecting a single hull shot encode point 320 for which bitrate is increased and quality is increased, thereby generating a collection of encoded video sequences 386 with increasing bitrate and increasing quality as per the quality metric 158($y$) associated with the shot encode points 320.

In one embodiment, the trellis iterator 360 adds hull shot encode points 320 prior to ascending the sequence trellis 370 in order to create a terminating condition. In doing so, the trellis iterator 360 may duplicate hull shot encode points 320 having the greatest bitrate 246 to cause the rate of change between the second to last and the last hull shot encode points 320 to be zero. When this zero rate of change is detected for all the shot sequences 132, La, when the maximum magnitude of rate of change is exactly zero, the trellis iterator 360 identifies the terminating condition and stops iterating.

Generating New Encoding Points

FIG. 5 is a more detailed illustration of the target evaluation application 270 of FIG. 2, according to various embodiments. For explanatory purposes only, FIG. 5 depicts the target evaluation application 270($x$) that is associated with the configured encoder 162($x$). As shown, the target evaluation application 270($x$) includes, without limitation, the target encode generator 272, the encoder dataset 170($x$), and the encoding list expander 274.

In operation, the target evaluation application 270($x$) evaluates the optimized encoding datasets 260 based on the target quality list 152. As shown, the target evaluation application 270($x$) includes, without limitation, a baseline targeting engine 502, targeting engines 510(1)-510(3), metric datasets 520(0)-520(3), and a target bitrate list 530. In alternate embodiments, the total number of quality metrics 158 may vary and the total number of instances of the targeting engine 510 and the total number of metric datasets 520 will vary accordingly.

First, the baseline targeting engine 502 generates the metric dataset 520($x$,0) corresponding to the baseline quality metric 158(0) of HVMAF based on the optimized encoding dataset 260(0). The metric dataset 520($x$,0) includes, without limitation the global convex hull 390($x$,0), and a different target hull index 522 for each of the target quality scores 154 included in the target quality list 152. The global convex hull 390($x$,0) is included in the optimized encoding dataset 260(0). Each of the target hull indices 522 specifies the index of one of the video encode points 380 included in the global convex hull 390($x$,0). More precisely, the target hull index 522($t$) specifies the index of the video encode point 380 included in the global convex hull 390($x$,0) that is closest to the target quality score 154($t$) with respect to the baseline quality metric 158(0).

For each target quality score 154($t$), the baseline targeting engine 502 maps the target quality score 154($t$) to the target hull index 522($t$) included in the metric dataset 520($x$,0) using the global convex hull 390($x$,0). The target hull index 522($t$) is the index of the video encode point 380 included in the global convex hull 390($x$,0) having the quality score 348 that is closest to the target quality score 154($t$). The encoded video sequence 386 included in the video encode point 380 specified by the target hull index 522($t$) is the target encoded video sequence 386 that is currently associated with the target quality score 154(t), the baseline quality metric 158 (0), and the configured encoder 162(x). As persons skilled in the art will recognize, as the global convex hull 390(x,0) is updated to better reflect the target quality scores 154, the associated target encoded video sequences 386 may change.

The baseline targeting engine 502 also generates the target bitrate list 530. As shown, the target bitrate list 530 includes, without limitation, a different target bitrate 532 for each of the target quality scores 154. As described previously herein in conjunction with FIG. 1, a given global convex hull 390 can be used to map bitrates 246 to quality scores 348 for the quality metric 158 associated with the global convex hull 390. Conversely, the global convex hull 390 can be used to map quality scores 348 for the quality metric 158 associated with the global convex hull 390 to bitrates 246. Accordingly, to determine the target bitrate 532(t) the baseline targeting engine 502 maps the target quality score 154(t) to the corresponding bitrate 246 using the global convex hull 390(x,0).

For each of the non-baseline quality metrics 158, the associated targeting engine 510 generates the associated metric dataset 520 based on the target bitrate list 530 and the associated global convex hull 390 included in the associated optimized encoding dataset 260. Accordingly, the targeting engine 510(1) generates the metric dataset 520(x,1) based on the target bitrate list 530 and the global convex hull 390(x,1) included in the associated optimized encoding dataset 260(1). The targeting engine 510(2) generates the metric dataset 520(x,2) based on the target bitrate list 530 and the global convex hull 390(x,2) included in the associated optimized encoding dataset 260(2). The targeting engine 510(3) generates the metric dataset 520(x,3) based on the target bitrate list 530 and the global convex hull 390(x,3) included in the associated optimized encoding dataset 260(3).

To generate the metric dataset 520(x,y) based on the target bitrate list 530, the targeting engine 510(y) maps each target bitrate 532(t) to the target hull index 522(t) included in the metric dataset 520(x,y) using the global convex hull 390(x,y). The target hull index 522(t) is the index of the video encode point 380 included in the global convex hull 390(x,y) having the bitrate 246 that is closest to the target bitrate 532(t). The encoded video sequence 386 included in the video encode point 380 specified by the target hull index 522(t) is the target encoded video sequence 386 that is currently associated with the target quality score 154(t), the quality metric 158(y), and the configured encoder 162(x). As persons skilled in the art will recognize, as the global convex hull 390(x,y) is updated to better reflect the target quality scores 154, the associated target encoded video sequences 386 may change.

The target encode generator 272 generates the encoder dataset 170(x) that includes, without limitation, the metric datasets 520(x,0-3). The target encode generator 272 then evaluates the encoder dataset 170(x) to determine whether to continue iterating. The target encode generator 272 may determine whether to continue iterating in any technically feasible fashion. For instance, in some embodiments, the target encode generator 272 determines whether to continue iterating based on whether there are any changes in the target encoded video sequences 386 between iterations. If there are any changes, then the target encode generator 272 transmits the encoder dataset 170(x) to the encoding list expander 274 to generate new encoding points 212 for the next iteration. Otherwise, the target encode generator 272 transmits the encoder dataset 170(x) to the comparison engine 180 and the iterative dynamic optimizer 140(x) ceases to iterate.

As shown, the encoding list expander 274 includes, without limitation, an encoding point optimizer 540 and the consolidated update data 292. As described previously in conjunction with FIGS. 3 and 4A-4D, each shot encode sequence 382 specifies the shot encode points 320 that include encoded shot sequences 248 that are included in the encoded video sequence 386. For each of the target encoded video sequences 386(t), the encoding list expander 274 generates a different target interpolation result 550(t). Each target interpolation result 550 includes, without limitation, encoding list updates 552(0)-552(S). Each of the encoding list updates 552(s) is associated with the shot sequence 132(s).

In general, the encoding point optimizer 540 generates the encoding list update 552(s) included in the target interpolation result 550(t) based on the "target" shot encode point 320 that is associated with both the shot sequence 132(s) and an associated target hull index 522 and, consequently, an associated targeted encoded video sequence 386. The encoding point optimizer 540 evaluates the location of the target shot encode point 320 along the associated convex hull 350 to identify one or more nearby shot encode points 320 on the convex hull 350. Based on the resolutions 242 and the QP values 244 of the target shot encode point 320 and the nearby shot encode points 320, the encoding point optimizer 540 generates the encoding list update 552(s) associated with the shot sequence 132(s). As part of generating the encoding list update 552(s), the encoding point optimizer 540 may generate any number of additional encoding points 212 for the shot sequence 132(s).

Subsequently, for each shot sequence 132(s), the encoding list expander 274 generates a consolidated encoding list update 562(s) based on the different encoding list updates 552(s) associated with the shot sequence 132(s). As part of generating the consolidated encoding list updates 562, the encoding list expander 274 removes any duplicated encoding points 212. The encoding list expander 274 then generates the consolidated update data 292 that includes, without limitation, the consolidated encoding list updates 562 and transmits the consolidated update data 292 to the iterative dynamic optimizer 140. The iterative dynamic optimizer 140 expands the encoding lists 210 based on the consolidated update data 292 and initiates a new iteration. In this manner, the iterative dynamic optimizer 140 iteratively refines the range of the encoding points 212 in order to efficiently converge to the encoded video sequences 386 that best match the target quality scores 154.

FIG. 6 illustrates an exemplary global convex hull 390 that is generated by the dynamic optimizer 250 of FIG. 2 using the video encode points 380 shown in FIGS. 4A-4D, according to various embodiments. For explanatory purposes only, the exemplary global convex hull 390 is associated with a non-baseline quality metric 158. As shown, a graph 600 includes the bitrate axis 410 and a quality axis 610.

As described in detail in conjunction with FIGS. 4A-4D, the trellis iterator 360 generates the shot encode sequence 382 in an ascending manner to increase the quality score 348 and increase the bitrate 246. Consequently, the associated encoded video sequences 386 span a range from a low quality score 348 and a low bitrate 246 to a high quality score 348 and a high bitrate 246. Among other things, each of the video encode points 380(x) includes the bitrate 246 of the encoded video sequence 386(x) and the quality score 348 of the encoded video sequence 386(x).

As shown, the dynamic optimizer 250 plots the different video encode points 380 against the bitrate axis 410 and the quality axis 610, to generate the global convex hull 390. The dynamic optimizer 250 then connects the points (i.e., the video encode points 380) included in the global convex hull 390 to generate a bitrate-quality curve 630. Accordingly, the bitrate-quality curve 630 represents the quality score 348 as a function of the bitrate 246 across all the encoded video sequences 386.

In general, based on the bitrate-quality curve 630, the dynamic optimizer 250 can select, for a given bitrate 246, the video encode point 380 that includes the encoded video sequence 386 that maximizes the quality score 348. Conversely, the dynamic optimizer 250 can select, for a given quality score 348, the video encode point 380 that includes the encoded video sequence 386 that minimizes the bitrate 246 for the given quality score 348.

Because the global convex hull 390 is associated with a non-baseline quality metric 158, the targeting engine 510 selects the target video encode points 380 based on the target bitrate list 530. More precisely, for each target bitrate 532($t$) included in the target bitrate list 530, the targeting engine 510 selects the video encode point 380 that includes the encoded video sequence 386 having the bitrate 246 that lies closest to the target bitrate 532($t$).

As shown, based on the target bitrate 532(0), the targeting engine 510 selects the video encode point 380(2) that includes the encoded video sequence 386(2). Notably, the encoded video sequence 386(2) is the encoded video sequence 386 that maximizes the quality score 348 for the target bitrate 532(0). The video encode point 380(2) also includes the shot encode sequence 382(2).

In a similar fashion, the targeting engine 510 selects the video encode point 380(4) that includes the encoded video sequence 386(4) based on the target bitrate 532(1). In addition, the targeting engine 510 selects the video encode point 380(5) that includes the encoded video sequence 386(5) based on the target bitrate 532(2).

As described previously in conjunction with FIGS. 3 and 4A-4D, the shot encode sequence 382(2) specifies the shot encode points 320 that include encoded shot sequences 248 that are included in the encoded video sequence 386(2). As shown, the encoded video sequence 386(2) includes the encoded shot sequence dynamic optimizer 250 derived from a 640×360 version of the shot sequence 132(0) and encoded using the QP value 244 of 26, followed by the encoded shot sequence 248 derived from a 640×360 version of the shot sequence 132(1) and encoded using the QP value 244 of 51, followed by the encoded shot sequence 248 derived from a 640×360 version of the shot sequence 132(2) and encoded using the QP value 244 of 51, etc.

Computing BD-Rate Values

Figure 7:
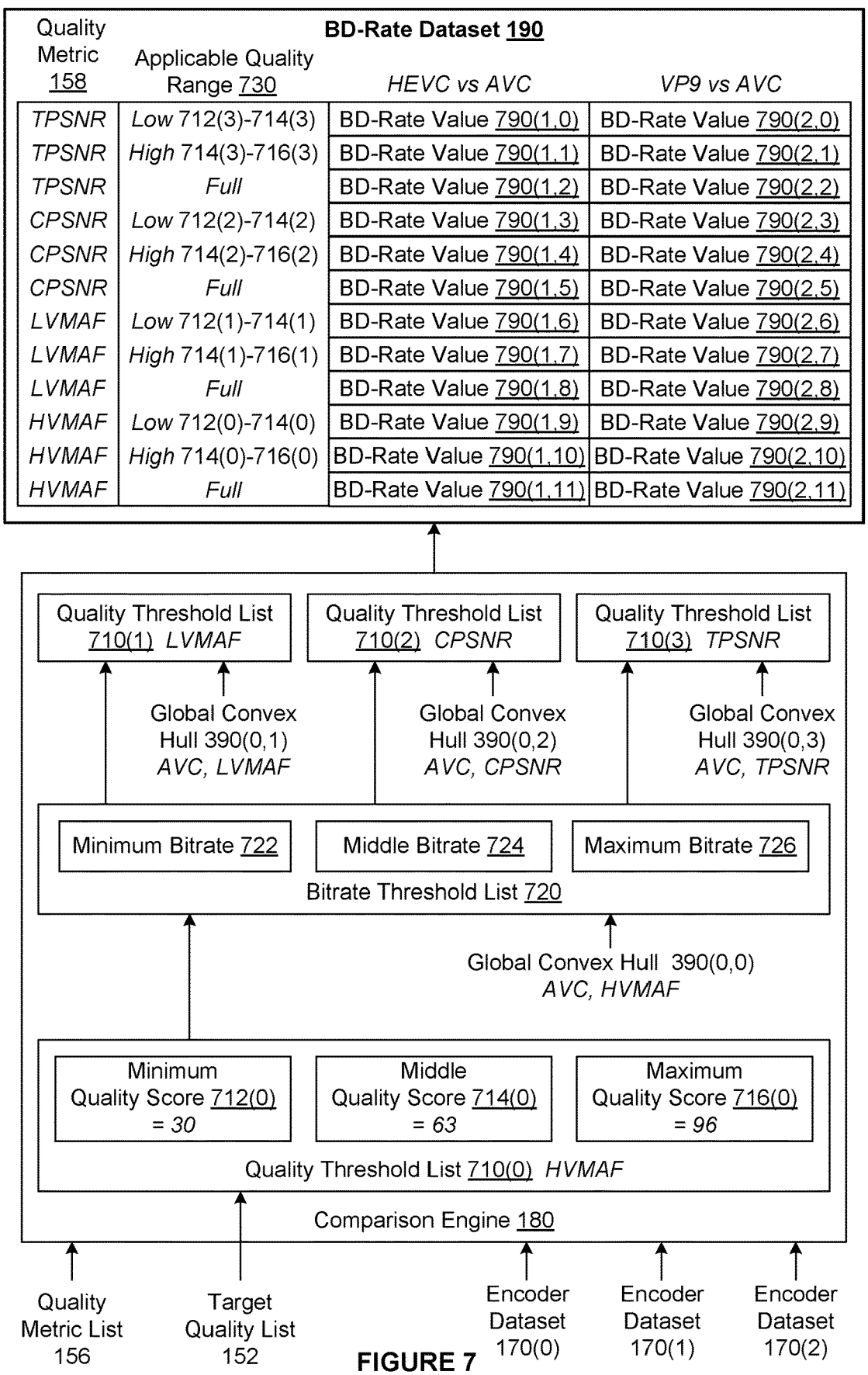
FIG. 7 is a more detailed illustration of the comparison engine of FIG. 1, according to various embodiments.

FIG. 7 is a more detailed illustration of the comparison engine 180 of FIG. 1, according to various embodiments. For explanatory purposes only, the comparison engine 180 is described in the context of generating the BD-rate dataset 190 based on the encoder datasets 170(0)-170(2), the target quality list 152, and the quality metric list 156. As described previously herein, the encoder dataset 170(0) is associated with the baseline configured encoder 162(0), the encoder dataset 170(1) is associated with the configured encoder 162(1) and the encoder dataset 170(2) is associated with the configured encoder 162(2).

As shown, the comparison engine 180 includes, without limitation, the quality threshold lists 710(0)-710(3) and a bitrate threshold list 720. The quality threshold list 710($y$) is associated with the quality metric 158($y$) included in the quality metric list 156. The quality threshold list 710($y$) includes, without limitation, a minimum quality score 712($y$) for the quality metric 158($y$), a middle quality score 714($y$) for the quality metric 158($y$), and a maximum quality score 716($y$) for the quality metric 158($y$). The bitrate threshold list 720 includes, without limitation, a minimum bitrate 722, a middle bitrate 724, and a maximum bitrate 726.

In operation, the comparison engine 180 generates the quality threshold list 710(0) associated with the baseline quality metric 158(0) based on the target quality list 152. The comparison engine 180 sets the minimum quality score 712(0) equal to the minimum target quality score 154 included in the target quality list 152. Similarly, the comparison engine 180 sets the maximum quality score 716(0) equal to the maximum target quality score 154 included in the target quality list 152. The comparison engine 180 then sets the middle quality score 714(0) equal to the average of the minimum quality score 712(0) and the maximum quality score 716(0).

The comparison engine 180 then computes the bitrate threshold list 720 based on the quality threshold list 710(0) and the global convex hull 390(0,0) included in the encoder dataset 170. As described previously herein, the global convex hull 390(0,0) is associated with both the baseline configured encoder 162(0) and the baseline quality metric 158(0). The comparison engine 180 maps the minimum quality score 712(0) to a first "baseline" bitrate 246 via the global convex hull 390(0,0) and then sets the minimum bitrate 722 equal to the first baseline bitrate 246. The comparison engine 180 maps the middle quality score 714(0) to a second baseline bitrate 246 via the global convex hull 390(0,0) and then sets the middle bitrate 724 equal to the second baseline bitrate 246. The comparison engine 180 maps the maximum quality score 716(0) to a third baseline bitrate 246 via the global convex hull 390(0,0) and then sets the maximum bitrate 726 equal to the third baseline bitrate 246.

In general, to map a given quality score 348 (e.g., the minimum quality score 712(0)) to a bitrate 246 via a given global convex hull 390, the comparison engine 180 determines the bitrate 246 specified by the bitrate-quality curve 630 associated with the global convex hull 390 for the quality score 348. Conversely, to map a given bitrate 246 to a quality score 348 via a given global convex hull 390, the comparison engine 180 determines the quality score 348 specified by the bitrate-quality curve 630 associated with the global convex hull 390 for the bitrate 246.

The comparison engine 180 determines the quality threshold lists 710(1), 710(2), and 710(3) for, respectively, the non-baseline quality metrics 158(1), 158(2), and 158(3) based on the bitrate threshold list 720 and, respectively, the global convex hull 390(0,1), the global convex hull 390(0,2), and the global convex hull 390(0,3). The global convex hull 390(0,$x$) is included in the encoder dataset 170(0) associated with the baseline configured encoder 162(0) and is associated with the quality metric 158($y$). To generate the quality threshold list 710($y$) associated with a non-baseline quality metric 158($y$), the comparison engine 180 maps the minimum bitrate 722, the middle bitrate 724, and the maximum bitrate 726 to, respectively, the minimum quality score 712($y$), the middle quality score 714($y$), and the maximum quality score 716($y$) via the global convex hull 390(0,$x$).

Advantageously, while each of the minimum quality score 712, the middle quality score 714, and the maximum quality score 716 vary across the quality threshold lists 710, the corresponding bitrates 246 as per the baseline configured encoder 162(0) do not vary. Furthermore, the quality threshold list 710(0) is consistent with the target quality scores 154 used to optimize the global convex hulls 390.

The comparison engine 180 then defines a low quality range and a high quality range based on the quality threshold lists 710. For the quality metric 158(y), the low quality range is bounded by the minimum quality score 712(y) and the middle quality score 714(y). By contrast, the high quality range is bounded by the middle quality score 714(y) and the maximum quality score 716(y). Notably, half of the target quality scores 154 map to the low quality range and half of the target quality scores 154 map to the high quality range. The comparison engine 180 also defines a full quality range that, for the quality metric 158(y), includes all the valid values for the quality metric 158(y).

Finally, the comparison engine 180 computes the BD-rate dataset 190 based on the quality ranges and the global convex hulls 390. As shown, the BD-rate dataset 190 includes, without limitation, a BD-rate value 790 for each combination of non-baseline configured encoder 162, quality metric 158, and an applicable quality range 730. The comparison engine 180 computes the BD-rate values 790 associated with a given non-baseline configured encoder 162(x) and the quality metric 158(y) based on the global convex hull 390(x,y) and the global convex hull 390(0,y). The global convex hull 390(x,y) is associated with both the non-baseline configured encoder 162(x) and the quality metric 158(y), while the global convex hull 390(0,y) is associated with both the baseline configured encoder 162(0) and the quality metric 158(y), To compute the BD-rate value 790 associated with the low quality range, the comparison engine 180 selects a first portion of the bitrate-quality curve 630 derived from the global convex hull 390(x,y) that corresponds to the low quality range and a second portion of the bitrate-quality curve 630 derived from the global convex hull 390(0,y) that corresponds to the low quality range. The comparison engine 180 then sets the BD-rate value 790 associated with the configured encoder 162(x), the quality metric 158(y), and the low quality range to an average bitrate difference between the first portion of the global convex hull 390(x,y) and the second portion of the global convex hull 390(0,y) for the same quality score 348.

For explanatory purposes only, some exemplary values are illustrated in italics. The baseline configured encoder 162(0) is a configured AVC encoder, the configured encoder 162(1) is a configured HEVC encoder, and the configured encoder 162(2) is a configured VP9 encoder. The baseline quality metric 158(0) is HVMAF, the quality metric 158(1) is LVMAF, the quality metric 158(2) is CPSNR, and the quality metric 158(3) is TPSNR. The low quality range for VMAF is bounded by the minimum quality score 712(0) of 30 and the middle quality score 714(0) of 63, the high quality range for VMAF is bounded by the middle quality score 714(0) of 63 and the maximum quality score 716(0) of 96. Although not shown, the full quality range for VMAF is bounded by 0 and 100.

Accordingly, the BD-rate dataset 190 includes twenty-four different BD-rate values 790. Each BD-rate value 790 is associated with one of the quality metrics 158, one of the non-baseline configured encoders 162, and the applicable quality range 730 that specifies one of the low quality range, the high quality range, and the full quality range. As shown, the twelve BD-rate values 790(1,0)-790(1,11) quantify differences between the configured encoder 162(1) and the baseline configured encoder 162(0) and the twelve BD-rate values 790(2,0)-790(2,11) quantify differences between the configured encoder 162(2) and the baseline configured encoder 162(0).

In alternate embodiments, the comparison engine 180 may compute any number of performance values for any type of encoder comparison metric based on any number of encoder datasets 170 and any amount (including none) of additional information in any technically feasible fashion. Furthermore, the comparison engine 180 may organize, display, store, and/or transmit any number of the computed performance values in any technically feasible fashion.

In some alternate embodiments, the encoder comparison application 150 may generate different encoder datasets 170 for any number of source video sequences 122 and the comparison engine 180 may compute BD-rate values 790 for each different source video sequence 122. The comparison engine 180 may subsequently aggregate different subsets of the BD-rate values 790 based on the type and/or complexity of the different source video sequences 122 to determine composite BD-rate values 790.

Advantageously, computing different BD-rate values 790 based on different combinations of configured encoders 162, quality metrics 158, quality ranges, and/or different types of source video content can increase the accuracy and reliably of each BD-rate value 790 for the associated quality metric 158, quality range, and/or type of source video content. Furthermore, analyzing the BD-rate values 790 can provide insight into the strengths and weaknesses of each configured encoder 162.

For instance, in some alternate embodiments, the baseline configured encoder 162(0) is a configured AVC encoder, the configured encoder 162(1) is a configured HEVC encoder, and the configured encoder 162(2) is a configured VP9 encoder. In addition, the comparison engine 180 is configured to compare each of the configured encoders 162 to each of the other configured encoders 162, and each of the configured encoders 162 over different types of encoded source video content.

The subset of BD-rate values 790 associated with the full quality range and all types of source video content indicates that both the configured HEVC encoder and the configured VP9 encoder outperform the configured AVC encoder irrespective of the quality metric 158. The subset of BD-rate values 790 further indicates that the configured VP9 encoder and the configured HEVC encoder perform similarly when quality is measured based on either TPSNR or CPSNR, while the configured VP9 encoder outperforms the configured HEVC encoder when quality is measured based on either HVMAF or LVMAF.

Other subsets of the BD-rate values 790 indicate that the configured HEVC encoder performs better when encoding natural video content than when encoding animated video content irrespective of the quality metric 158. Yet other subsets of the BD-rate values 790 indicate that the configured VP9 encoder performs better over the high quality range than over the low quality range irrespective of the quality metric 158.

In various embodiments, any number of the configured encoders 162 may be associated with the same encoder but different configurations. The resulting BD-rate values 790 can provide insight into the performance difference attributable to the different configurations. For instance, as persons skilled in the art will recognize, the "tune" parameter for a VP9 encoder can typically be set to "PSNR" or "visual." If the tune parameter is PSNR, then the VP9 encoder implements additional tuning operations based on PSNR. By contrast, if the tune parameter is visual, then the VP9 encoder implements additional tuning operations based on visual appearance. To gain insight into the performance difference associated with the tune parameter, one configured encoder 162 could be associated with both the VP9 encoder and the value of PSNR for the tune parameter while another configured encoder 162 could be associated with both the VP9 encoder and the value of visual for the tune parameter.

Figure 8A:
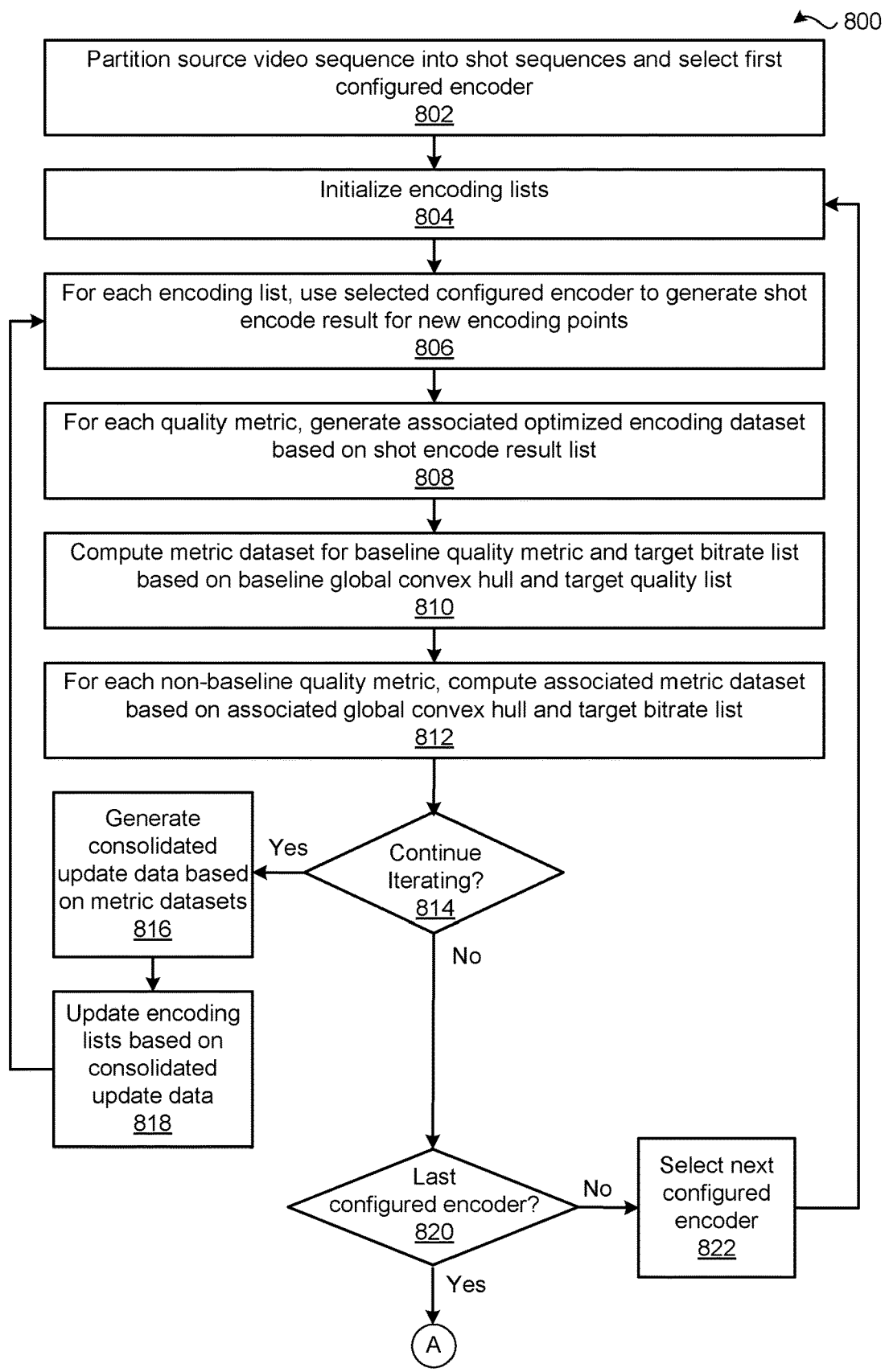
FIGS. 8A-8B set forth a flow diagram of method steps for comparing the encoding performance of different configured encoders, according to various embodiments.
Figure 8B:
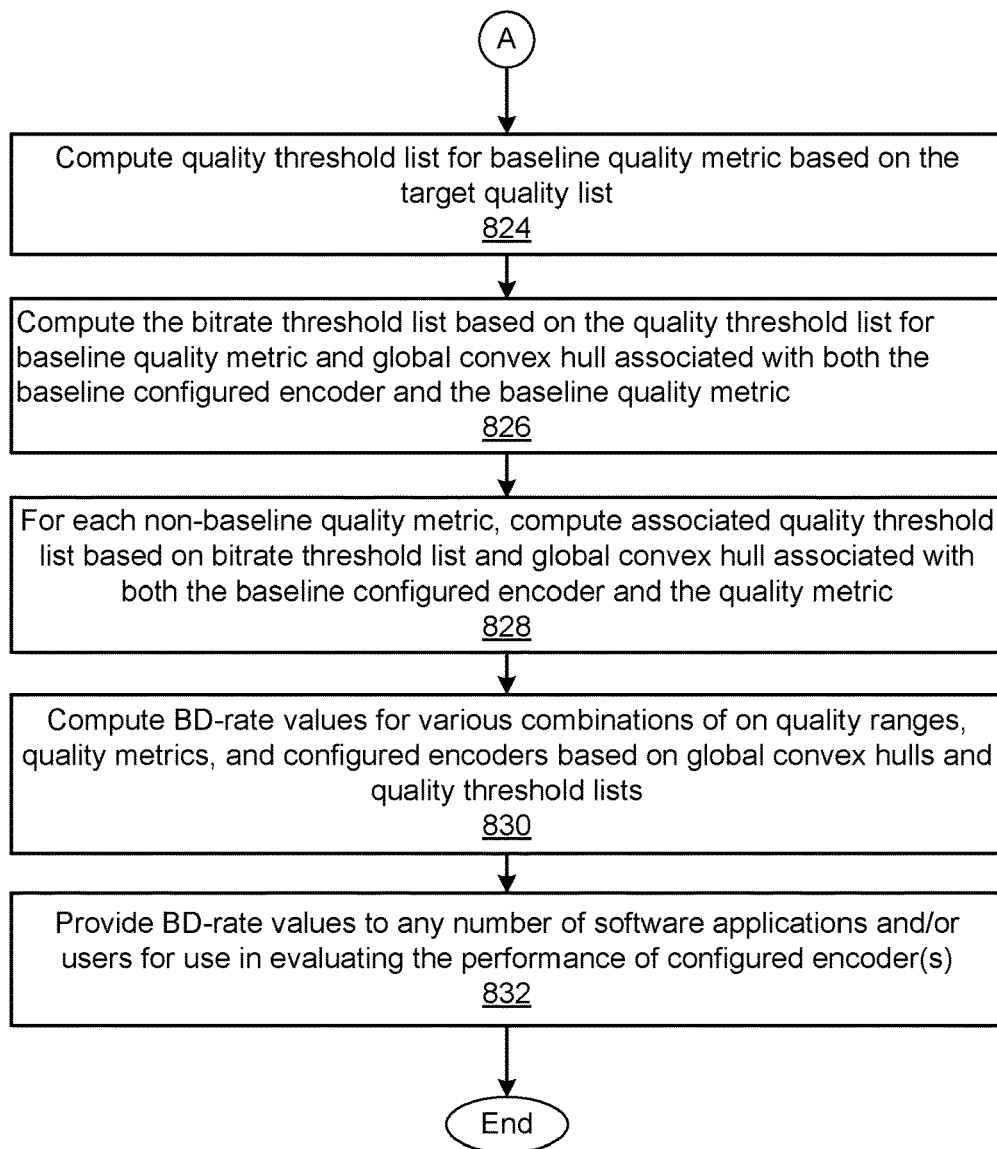

FIGS. 8A-8B set forth a flow diagram of method steps for comparing the encoding performance of different configured encoders, according to various embodiments. Although the method steps are described with reference to the systems of FIGS. 1-7, persons skilled in the art will understand that any system configured to implement the method steps, in any order, falls within the scope of the various embodiments. For instance, in various embodiments, different instances of the iterative dynamic optimizer 140 perform any number and/or portions of the steps 804-818 in parallel.

As shown, a method 800 begins at step 802, where the encoder comparison application 150 partitions the source video sequence 122 into the shot sequences 132 and selects the first configured encoder 162(0). At step 804, the iterative dynamic optimizer 140 initializes the encoding lists 210 Each of the encoding points 212 included in the encoding lists 210 includes the resolution 242 and the QP value 244. In alternate embodiments, each of the encoding points 212 may specify any number and type of encoding parameter values instead of or in addition to the QP value 244.

At step 806, for each of the encoding lists 210, the iterative dynamic optimizer 140 identifies the new encoding points 212 and generates the corresponding shot encode results 240 using the selected configured encoder 162. At step 808, for each of the quality metrics 158 included in the quality metric list 156, the dynamic optimizer 250 generates the associated optimized encoding dataset 260.

At step 810, the baseline targeting engine 502 computes the baseline metric dataset 520 and the target bitrate list 530 based on the baseline optimized encoding dataset 260 and the target quality list 152. At step 812, for each of the non-baseline quality metrics 158, the targeting engine 510 computes the associated metric dataset 520 based on the associated optimized encoding dataset 260 and the target bitrate list 530.

At step 814, the target evaluation application 270 determines whether iterative dynamic optimizer 140 is to continue iterating based on the metric datasets 520. If, at step 814, the target evaluation application 270 determines that the iterative dynamic optimizer 140 is to continue iterating, then the method 800 proceeds to step 816. At step 816, the encoding list expander 274 generates the consolidated update data 292 based on the metric datasets 520. At step 818, the iterative dynamic optimizer 140 updates the encoding lists 210 based on the consolidated update data 292, and the method 800 returns to step 806, where the iterative dynamic optimizer 140 generates new shot encode results 240.

If, however, at step 814, the target evaluation application 270 determines that the iterative dynamic optimizer 140 is to cease iterating, then the method 800 proceeds directly to step 820. At step 820, the encoder comparison application 150 determines whether the selected configured encoder 162 is the last configured encoder 162. If, at step 820, the encoder comparison application 150 determines that the selected configured encoder 162 is not the last configured encoder 162, then the method 800 proceeds to step 822. At step 822, the encoder comparison application 150 selects the next configured encoder 162 and the method 800 returns to step 804, where the iterative dynamic optimizer 140 initializes the encoding lists 210.

If, however, at step 820, the encoder comparison application 150 determines that the selected configured encoder 162 is the last configured encoder 162, then the method 800 proceeds directly to step 824. At step 824, the comparison engine 180 computes the quality threshold list 710 for the baseline quality metric 158 based on the target quality list 152. At step 826, the comparison engine 180 computes the bitrate threshold list 720 based on the quality threshold list 710 for the baseline quality metric 158 and the global convex hull 390 associated with both the baseline configured encoder 162 and the baseline quality metric 158.

At step 828, for each non-baseline quality metric 158, the comparison engine 180 computes the associated quality threshold list 710 based on the bitrate threshold list 720 and the global convex hull 390 associated with both the baseline configured encoder 162 and the quality metric 158. At step 830, the comparison engine 180 computes the BD-rate values 790 for various combinations of quality ranges, the quality metrics 158, and the configured encoders 162 based on the global convex hulls 390 and the quality threshold lists 710. In alternate embodiments, the comparison engine 180 may compute values for any type of encoder comparison metric instead of or in addition to computing the BD-rate values 790. At step 832, the comparison engine 180 provides any number of the BD-rate values 790 to any number of software applications and/or users for use in evaluating the performance of the configured encoder(s) 162. The method 800 then terminates.

In sum, the disclosed techniques can be used to accurately and reliably compare the encoding performance of different configured encoders. An encoding comparison application includes, without limitation, a shot analyzer, an iterative dynamic optimizer, and a comparison engine. In operation, the shot analyzer partitions a source video sequence into multiple shot sequences. For each of any number of configured encoders, a different instance of the iterative dynamic optimizer iteratively optimizes a different set of global convex hulls, where each set of global convex hulls includes a different global convex hull for each of any number of quality metrics. Accordingly, the instances of the iterative dynamic optimizer generate X*Y global convex hulls, where X is the number of configured encoders and Y is the number of quality metrics. Each instance of the iterative dynamic optimizer generates the associated set of global convex hulls based on the quality metrics, the shot sequences and, for each shot sequences, an encoding list that initially includes relatively sparsely distributed encoding points. Each encoding point specifies a resolution and a quantization parameter (QP) value, and one of the configured encoders is a "baseline" configured encoder.

To initiate each iteration, the iterative dynamic optimizer generates new shot encode results based on the associated configured encoder and new encoding points included in the encoding lists. A "new" encoding point is an encoding point for which the iterative dynamic optimizer has not previously generated an associated encoded shot sequence. Each shot encode result includes, without limitation, an encoded shot sequence, a resolution, a QP value, and a bitrate. Subsequently, for each shot sequence, the iterative dynamic optimizer configures different instances of a dynamic optimizer to generate different global convex hulls based on the associated encoded shot sequences and different quality metrics. One of the quality metrics is a "baseline" perceptual quality metric HVMAF).

For each new shot encode result, the dynamic optimizer computes a quality score based on the associated quality metric and then adds the quality score to the shot encode result to generate a shot encode point. Subsequently, for each shot sequence, the dynamic optimizer generates a convex hull that includes a subset of the shot encode points associated with the shot sequence. In general, for a given shot sequence, the shot encode points included in the associated convex hull minimize the bitrate for different quality scores as per the quality metric associated with the dynamic optimizer.

The dynamic optimizer then evaluates the convex hulls across all of the shot sequences to determine shot encode sequences. Each shot encode sequence specifies shot encode points for the different shot sequences. For each shot encode sequence, the dynamic optimizer aggregates the different encoded shot sequences included in the shot encode points to generate an encoded video sequence. For each shot encode sequence, the dynamic optimizer then generates a video encode point that includes the shot encode sequence, the associated encoded video sequence, a bitrate for the encoded video sequence, and a quality score for the encoded video sequence. Subsequently, the dynamic optimizer generates a global convex hull based on the video encode points. In general, for the source video sequence, the video encode points included in the global convex hull minimize the bitrate for different quality scores as per the associated quality metric.

A target evaluation application included in the iterative encoding application evaluates the global convex hulls based on any number of target quality scores. First, an instance of a targeting engine processes the "baseline" global convex hull generated using the baseline perceptual quality metric based on any number of target quality scores. For each target quality score, the targeting engine selects the encoded video sequence in the baseline global convex hull having a quality score closest to the target quality score as an associated target encoded video sequence for the baseline quality metric Subsequently, the target evaluation maps each of the target quality scores to a target bitrate using the baseline global convex hull. For each of the non-baseline quality metrics, the target evaluation application configures a different instance of the targeting engine to process the global convex hull generated using the quality metric based on the target bitrates. For each target bitrate, the targeting engine selects the encoded video sequence in the associated global convex hull having a bitrate closest to the target bitrate as an associated target encoded video sequence for the associated quality metric.

The target evaluation application then determines whether the iterative dynamic optimizer is to continue iterating based on whether any of the target encoded video sequences have changed since the previous iteration. If the target evaluation application determines that one or more of the target encoded video sequences have changed, then the target evaluation application generates an encoding list update for each shot sequence in each target encoded video sequence based on the associated target quality score. Each encoding list update includes any number (including zero) of additional shot-specific encoding points.

For each shot sequence, the target evaluation application generates a consolidated encoding list update based on the encoding list updates associated with the shot sequence. As part of generating the consolidated encoding list updates, the target evaluation application removes any duplicated encoding points. For each shot sequence, the iterative dynamic optimizer adds any encoding points included in the associated consolidated encoding list update to the associated encoding list. The iteration dynamic optimizer then executes a new iteration based on the updated encoding lists.

The iterative encoding application continues to operate in this fashion until the target evaluation application determines that the target encoded video sequences have not changed since the previous iteration. The iterative dynamic optimizer then ceases iterating and transmits an encoder dataset to the comparison application. For each of the quality metrics, the encoder dataset specifies the global convex hull and the associated target encoded video sequences.

The comparison engine generates a quality threshold list associated with the baseline quality metric based on the target quality scores. The "baseline" quality threshold list includes, without limitation, a minimum quality score, a middle quality score, and a highest quality score. The comparison engine then maps the baseline quality threshold list to a bitrate threshold list using the global convex hull associated with both the baseline encoded video sequence and the baseline configured encoder. In a similar fashion, for each non-baseline quality metric, the comparison engine maps the bitrate threshold list to a quality threshold list associated with the non-baseline quality metric using the global convex hull associated with both the non-baseline quality metric and the baseline configured encoder.

The comparison engine defines three different quality ranges—a low quality range, a middle quality range, and a full quality ranges. For each quality metric, the low quality range is bounded by the minimum quality score and the middle quality score specified in the quality threshold list associated with the quality metric. Similarly, for each quality metric, the high quality range is bounded by the middle quality score and the maximum quality score specified in the quality threshold list associated with the quality metric. The full quality range includes all quality scores.

The comparison engine computes a BD-rate dataset that includes, without limitation, a BD-rate value for each combination of quality range, quality metric, and non-baseline configured encoder. To compute the BD-rate value for a particular quality range, quality metric, and non-baseline configured encoder, the comparison engine derives a first bitrate-quality curve from the global convex hull associated with both the quality metric and the non-baseline configured encoder and derives a second bitrate-quality curve from the global convex hull associated with both the quality metric and the baseline configured encoder. The comparison engine then computes the average percentage difference between the portion of the first bitrate-quality curve that is associated with the quality range and the portion of the second bitrate-quality curve that is associated with the quality range.

At least one technical advantage of the disclosed techniques relative to prior art is that the encoder comparison application can more effectively predict human-perceptible differences in the performance of video encoders/decoders. In that regard, the encoder comparison application can be configured to estimate quality using one or more perceptual quality metrics (e.g., based on VMAF) that, relative to fidelity metrics (e.g., based on PSNR), more accurately and reliably predict human-perceived visual quality. Furthermore, because the encoder comparison application compares the proper portions of bitrate-quality curves to compute BD-rate values for each quality range, the accuracy with which each BD-rate predicts performance differences between the associated configured encoders over the associated quality range is increased. In addition, the quality ranges can be defined to exclude extremely low quality scores and/or extremely high quality scores that can contribute disproportionately to BD-rate values. By more accurately and reliably predicting differences in encoding performance between different configured encoders, the encoder comparison application allows more valid conclusions to be drawn regarding whether one configured encoder performs better than another configured encoder. These technical advantages provide one or more technological advancements over prior art approaches.

1. In some embodiments, a computer-implemented method for comparing the performance of different configured encoders comprises generating a first global convex hull of video encode points based on a first configured encoder and a plurality of subsequences included in a source video sequence, wherein each video encode point is associated with a different encoded version of the source video sequence; generating a second global convex hull of video encode points based on a second configured encoder and the plurality of subsequences; and computing a first performance value for an encoding comparison metric based on the first global convex hull and the second global convex hull, wherein the first performance value estimates a difference in performance between the first configured encoder and the second configured encoder.

2. The computer-implemented method of clause 1, wherein the encoding comparison metric comprises a Bjontegaard rate difference (BD-rate).

3. The computer-implemented method of clauses 1 or 2, wherein each video encode point included the first global convex hull is associated with a bitrate and a quality score, wherein the quality score comprises a linear video multimethod assessment fusion score, a harmonic video multimethod assessment fusion score, a classic peak-signal-to-noise ratio, or a typical peak-signal-to-noise ratio.

4. The computer-implemented method of any of clauses 1-3, wherein the first configured encoder is associated with a first encoder, and the second configured encoder is associated with a second encoder that differs from the first encoder.

5. The computer implemented method of any of clauses 1-4, wherein the first configured encoder is associated with a first configuration that specifies at least one of a profile level, an analysis level, a search level, a psychovisual option, a performance option, or a tuning option.

6. The computer-implemented method of any of clauses 1-5, wherein each of the subsequences included in the plurality of subsequences comprises a shot sequence.

7. The computer-implemented method of any of clauses 1-6, wherein computing the first performance value comprises determining a first quality range based on a plurality of target quality scores for a visual quality metric; and performing one or more comparison operations between a first portion of the first global convex hull and a second portion of the second global convex hull, wherein both the first portion of and the second portion are associated with the first quality range.

8. The computer-implemented method of any of clauses 1-7, further comprising determining a second quality range based on the plurality of target quality scores; and performing one or more comparison operations between a third portion of the first global convex hull and a fourth portion of the second global convex hull to compute a second performance value, wherein both the third portion of and the fourth portion are associated with the second quality range, wherein the first performance value and the second performance value are subsequently used to compare the performance of the first configured encoder and the second configured encoder.

9. The computer-implemented method of any of clauses 1-8, wherein generating the first global convex hull comprises generating a first set of shot encode points based on the first configured encoder, a first set of encoding points, and a first subsequence included in the plurality of subsequences; performing a plurality of convex hull operations across the first set of shot encode points to generate a first convex hull; and determining a first video encode point included in the first global convex hull based on a first shot encode point included in the first convex hull and a second shot encode point included in a second convex hull, wherein the second convex hull is associated with both the first configured encoder and a second subsequence included in the plurality of subsequences.

10. The computer-implemented method of any of clauses 1-9, wherein a first video encode point included in the global convex hull is associated with a first encoded version of the source video sequence, and wherein at least one of a bitrate and a resolution varies across a third plurality of encoded subsequences included in the first encoded version of the source video sequence.

11. In some embodiments, one or more non-transitory computer readable media include instructions that, when executed by one or more processors, cause the one or more processors to compare the performance of different configured encoders by performing the steps of generating a first global convex hull of video encode points based on a first configured encoder and a plurality of subsequences included in a source video sequence, wherein each video encode point is associated with a different encoded version of the source video sequence, a different bitrate, and a different quality score; generating a second global convex hull of video encode points based on a second configured encoder and the plurality of subsequences; and computing a first performance value for an encoding comparison metric based on the first global convex hull and the second global convex hull, wherein the first performance value estimates a difference in performance between the first configured encoder and the second configured encoder.

12. The one or more non-transitory computer readable media of clause 11, wherein the encoding comparison metric comprises a Bjontegaard rate difference (BD-rate).

13. The one or more non-transitory computer readable media of clauses 11 or 12, wherein each quality score comprises a linear video multimethod assessment fusion score, a harmonic video multimethod assessment fusion score, a classic peak-signal-to-noise ratio, or a typical peak-signal-to-noise ratio.

14. The one or more non-transitory computer readable media of any of clauses 11-13, wherein the first configured encoder is associated with a first encoder, and the second configured encoder is associated with a second encoder that differs from the first encoder.

15. The one or more non-transitory computer readable media of any of clauses 11-14, wherein the first configured encoder is associated with a first encoder and a first value for a configuration parameter, and the second configured encoder is associated with the first encoder and a second value for the configuration parameter.

16. The one or more non-transitory computer readable media of any of clauses 11-15, wherein each of the subsequences included in the plurality of subsequences comprises a shot sequence.
17. The one or more non-transitory computer readable media of any of clauses 11-16, wherein computing the first performance value comprises determining a quality range for a first visual quality metric that is associated with both the first global convex hull and the second global convex hull based on a plurality of target bitrates for a second visual quality metric, a third global convex hull that is associated with the second visual quality metric, and the first global convex hull; and performing one or more comparison operations between a first portion of the first global convex hull and a second portion of the second global convex hull, wherein both the first portion of and the second portion are associated with the quality range.
18. The one or more non-transitory computer readable media of any of clauses 11-17, wherein generating the first global convex hull comprises generating a preliminary global convex hull based on a first plurality of encoded subsequences, wherein each encoded subsequence is associated with a first subsequence included in the plurality of subsequences and a different encoding point included in a first set of encoding points; computing a new encoding point that is not included in the first plurality of encoding points based on the first preliminary global convex hull and a target value for a first visual quality metric; and generating the first global convex hull based on a second plurality of encoded subsequences, wherein a first encoded subsequence included in the second plurality of encoded subsequences is associated with both the first subsequence and the new encoding point.
19. The one or more non-transitory computer readable media of any of clauses 11-18, wherein the preliminary global convex hull is associated with the first visual quality metric, and the global convex hull is associated with a second visual quality metric
20. In some embodiments, a system for comparing the performance of different configured encoders comprises one or more memories storing instructions; and one or more processors that are coupled to the one or more memories and, when executing the instructions, are configured to generate a first global convex hull of video encode points based on a first configured encoder and a plurality of subsequences included in a source video sequence, wherein each video encode point is associated with a different encoded version of the source video sequence; generate a second global convex hull of video encode points based on a second configured encoder and the plurality of subsequences; and compute a first performance value for an encoding comparison metric based on at least a first portion of the first global convex hull and at least a second portion of the second global convex hull, wherein the first performance value estimates a difference in performance between the first configured encoder and the second configured encoder.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. While the preceding is directed to embodiments of the present disclosure, other and further embodiments of the disclosure may be devised without departing from the basic scope thereof, and the scope thereof is determined by the claims that follow.

What is claimed is:

1. A computer-implemented method for comparing the performance of different encoders, the method comprising:
generating a first global convex hull of video encode points based on a first encoder, wherein each video encode point is associated with a different encoded version of a source video sequence;
generating a second global convex hull of video encode points based on a second encoder; and
computing a first performance value for an encoding comparison metric based on the first global convex hull and the second global convex hull.

2. The computer-implemented method of claim 1, wherein each of the first global convex hull of video encode points and the second global convex hull of encode points is further generated based on a plurality of subsequences included in the source video sequence.

3. The computer-implemented method of claim 2, wherein each subsequence included in the plurality of subsequences comprises a shot sequence.

4. The computer-implemented method of claim 1, wherein generating the second global convex hull of video encode points is further based on a plurality of subsequences included in the source video sequence.

5. The computer-implemented method of claim 1, wherein the first performance value estimates a difference in performance between the first encoder and the second encoder.

6. The computer-implemented method of claim 1, wherein the encoding comparison metric comprises a Bjontegaard rate difference (BD-rate).

7. The computer-implemented method of claim 1, wherein each video encode point included in the first global convex hull is associated with a bitrate and a quality score.

8. The computer-implemented method of claim 7, wherein the quality score comprises a linear video multimethod assessment fusion score, a harmonic video multimethod assessment fusion score, a classic peak-signal-to-noise ratio, or a typical peak-signal-to-noise ratio.

9. The computer-implemented method of claim 1, wherein a first video encode point included in the global convex hull is associated with a first encoded version of the source video sequence, and wherein at least one of a bitrate or a resolution varies across a plurality of encoded subsequences included in the first encoded version of the source video sequence.

10. The computer-implemented method of claim 1, wherein computing the first performance value for the encoding comparison metric comprises performing one or more comparison operations between a first portion of the first global convex hull and a second portion of the second global convex hull, wherein both the first portion and the second portion are associated with a quality range that is based on a plurality of target quality scores for a visual quality metric.

11. One or more non-transitory computer-readable media including instructions that, when executed by one or more processors, cause the one or more processors to perform the steps of:
generating a first global convex hull of video encode points based on a first encoder, wherein each video encode point is associated with a different encoded version of a source video sequence;
generating a second global convex hull of video encode points based on a second encoder; and
computing a first performance value for an encoding comparison metric based on the first global convex hull and the second global convex hull.

12. The one or more non-transitory computer-readable media of claim 11, wherein each of the first global convex hull of video encode points and the second global convex hull of encode points is further generated based on a plurality of subsequences included in the source video sequence.

13. The one or more non-transitory computer-readable media of claim 12, wherein each subsequence included in the plurality of subsequences comprises a shot sequence.

14. The one or more non-transitory computer-readable media of claim 11, wherein generating the second global convex hull of video encode points is further based on a plurality of subsequences included in the source video sequence.

15. The one or more non-transitory computer-readable media of claim 11, wherein the first performance value estimates a difference in performance between the first encoder and the second encoder.

16. The one or more non-transitory computer-readable media of claim 11, wherein the encoding comparison metric comprises a Bjontegaard rate difference (BD-rate).

17. The one or more non-transitory computer-readable media of claim 11, wherein each video encode point included in the first global convex hull is associated with a bitrate and a quality score.

18. The one or more non-transitory computer-readable media of claim 17, wherein the quality score comprises a linear video multimethod assessment fusion score, a harmonic video multimethod assessment fusion score, a classic peak-signal-to-noise ratio, or a typical peak-signal-to-noise ratio.

19. The one or more non-transitory computer-readable media of claim 11, wherein a first video encode point included in the global convex hull is associated with a first encoded version of the source video sequence, and wherein at least one of a bitrate or a resolution varies across a plurality of encoded subsequences included in the first encoded version of the source video sequence.

20. The one or more non-transitory computer-readable media of claim 11, wherein computing the first performance value for the encoding comparison metric comprises performing one or more comparison operations between a first portion of the first global convex hull and a second portion of the second global convex hull, wherein both the first portion and the second portion are associated with a quality range that is based on a plurality of target quality scores for a visual quality metric.

21. A system comprising:
one or more memories storing instructions; and
one or more processors that are coupled to the one or more memories and, when executing the instructions, are configured to perform the steps of:
  generating a first global convex hull of video encode points based on a first encoder, wherein each video encode point is associated with a different encoded version of a source video sequence;
  generating a second global convex hull of video encode points based on a second encoder; and
  computing a first performance value for an encoding comparison metric based on the first global convex hull and the second global convex hull.

22. The computer-implemented method of claim 1, wherein generating the first global convex hull of video encode points comprises:
  partitioning the source video sequence into a plurality of shot sequences;
  generating a plurality of shot encode points for a first shot sequence included in the plurality of shot sequences using the first encoder;
  generating a first convex hull for the first shot sequence based on the plurality of shot encode points;
  generating a plurality of video encode points based on the first convex hull and a second convex hull that is associated with a second shot sequence included in the plurality of shot sequences; and
  generating the first global convex hull of video encode points based on the plurality of video encode points.

* * * * *